United States Patent
Nimmagadda et al.

(10) Patent No.: US 11,979,415 B2
(45) Date of Patent: May 7, 2024

(54) ENFORCING THREAT POLICY ACTIONS BASED ON NETWORK ADDRESSES OF HOST THREATS

(71) Applicant: Juniper Networks, Inc., Sunnyvale, CA (US)

(72) Inventors: Srinivas Nimmagadda, San Jose, CA (US); Jeffrey S. Marshall, Santa Clara, CA (US); Sunil G. Rawoorkar, Pleasanton, CA (US); Srinivasan Veeraraghavan, Cupertino, CA (US); Prakash T. Seshadri, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 256 days.

(21) Appl. No.: 17/247,461

(22) Filed: Dec. 11, 2020

(65) Prior Publication Data

US 2021/0099472 A1   Apr. 1, 2021

Related U.S. Application Data

(63) Continuation of application No. 16/024,308, filed on Jun. 29, 2018, now Pat. No. 10,887,327.
(Continued)

(51) Int. Cl.
*H04L 9/40* (2022.01)
*H04L 67/52* (2022.01)

(52) U.S. Cl.
CPC ...... *H04L 63/1416* (2013.01); *H04L 63/0209* (2013.01); *H04L 63/1425* (2013.01);
(Continued)

(58) Field of Classification Search
CPC ............. H04L 63/0209; H04L 63/1425; H04L 63/1433; H04L 63/1441; H04L 63/20; H04L 63/1416; H04L 67/52
(Continued)

(56) References Cited

U.S. PATENT DOCUMENTS

| 7,483,437 B1 | 1/2009 | Mohaban |
| 7,930,734 B2 | 4/2011 | Foo et al. |

(Continued)

FOREIGN PATENT DOCUMENTS

| CN | 101068168 A | 11/2007 |
| CN | 101453363 A | 6/2009 |

(Continued)

OTHER PUBLICATIONS

Extended European Search Report for Application No. EP19163066.4, dated Jun. 28, 2019, 8 pages.
(Continued)

*Primary Examiner* — Teshome Hailu
(74) *Attorney, Agent, or Firm* — Harrity & Harrity, LLP

(57) ABSTRACT

A device receives information identifying a specific host threat to a network, where the information includes a list of network addresses associated with the specific host threat. The device identifies network elements, of the network, associated with the specific host threat to the network, and determines a network control system associated with the identified network elements. The device determines a policy enforcement group of network elements, of the identified network elements, that maps to the list of network addresses associated with the specific host threat, where the network control system is associated with the policy enforcement group of network elements. The device determines a threat policy action to enforce for the specific host threat, and causes, via the network control system, the threat policy (Continued)

action to be enforced by the policy enforcement group of network elements.

16 Claims, 16 Drawing Sheets

Related U.S. Application Data

(60) Provisional application No. 62/647,460, filed on Mar. 23, 2018, provisional application No. 62/647,431, filed on Mar. 23, 2018.

(52) U.S. Cl.
CPC ...... *H04L 63/1433* (2013.01); *H04L 63/1441* (2013.01); *H04L 63/20* (2013.01); *H04L 67/52* (2022.05)

(58) Field of Classification Search
USPC ........................................................ 726/1, 22
See application file for complete search history.

(56) References Cited

U.S. PATENT DOCUMENTS

| | | | |
|---|---|---|---|
| 8,443,435 B1 | 5/2013 | Schroeder | |
| 8,819,285 B1 | 8/2014 | Wilkinson et al. | |
| 9,516,053 B1* | 12/2016 | Muddu | G06V 10/225 |
| 9,680,691 B2 | 6/2017 | Tahara et al. | |
| 9,954,881 B1 | 4/2018 | Lin et al. | |
| 10,565,372 B1* | 2/2020 | Stickle | G06F 21/55 |
| 10,645,115 B2 | 5/2020 | C'P et al. | |
| 10,862,912 B2 | 12/2020 | Seshadri | |
| 10,929,538 B2 | 2/2021 | Jiang | |
| 2008/0244707 A1* | 10/2008 | Bowser | H04L 63/1441 726/4 |
| 2009/0265786 A1 | 10/2009 | Xie et al. | |
| 2011/0173699 A1* | 7/2011 | Figlin | H04L 63/1441 726/23 |
| 2013/0074143 A1 | 3/2013 | Bu et al. | |
| 2013/0174256 A1 | 7/2013 | Powers | |
| 2014/0180870 A1 | 6/2014 | Bombeck et al. | |
| 2014/0283061 A1 | 9/2014 | Quinlan et al. | |
| 2015/0058914 A1 | 2/2015 | Yadav | |
| 2015/0128274 A1 | 5/2015 | Giokas | |
| 2015/0135317 A1 | 5/2015 | Tock et al. | |
| 2015/0188949 A1* | 7/2015 | Mahaffey | H04L 63/0272 726/1 |
| 2015/0264073 A1* | 9/2015 | Tavakoli | H04L 63/1425 726/23 |
| 2016/0359872 A1* | 12/2016 | Yadav | H04L 63/20 |
| 2017/0019418 A1 | 1/2017 | Ikuse et al. | |
| 2017/0063917 A1 | 3/2017 | Chesla | |
| 2017/0063920 A1 | 3/2017 | Thomas et al. | |
| 2017/0142144 A1 | 5/2017 | Weinberger et al. | |
| 2017/0171235 A1 | 6/2017 | Mulchandani et al. | |
| 2017/0171318 A1 | 6/2017 | Levithan | |
| 2017/0201533 A1* | 7/2017 | Targali | H04L 63/1441 |
| 2017/0230412 A1 | 8/2017 | Thomas et al. | |
| 2017/0250997 A1* | 8/2017 | Rostamabadi | H04L 63/1425 |
| 2018/0004948 A1 | 1/2018 | Martin et al. | |
| 2018/0041515 A1 | 2/2018 | Gupta et al. | |
| 2018/0063143 A1 | 3/2018 | Wilson et al. | |
| 2018/0083967 A1 | 3/2018 | Subramanian et al. | |
| 2018/0131705 A1* | 5/2018 | Samadani | H04L 43/026 |
| 2018/0191681 A1* | 7/2018 | Mihelich | H04L 63/20 |
| 2018/0219899 A1* | 8/2018 | Joy | G06F 11/3433 |
| 2019/0098056 A1 | 3/2019 | Pitre et al. | |
| 2019/0116200 A1* | 4/2019 | Joy | G06F 11/301 |
| 2019/0260804 A1 | 8/2019 | Beck et al. | |
| 2019/0297094 A1 | 9/2019 | Nimmagadda | |
| 2020/0162516 A1 | 5/2020 | Israel et al. | |
| 2021/0075810 A1 | 3/2021 | Seshadri et al. | |

FOREIGN PATENT DOCUMENTS

| | | |
|---|---|---|
| CN | 101488855 A | 7/2009 |
| CN | 103404082 A | 11/2013 |
| CN | 103875222 A | 6/2014 |
| CN | 105580023 A | 5/2016 |
| CN | 105791311 A | 7/2016 |
| CN | 105991595 A | 10/2016 |
| CN | 106656922 A | 5/2017 |
| CN | 107872456 A | 4/2018 |
| CN | 108605227 A | 9/2018 |
| EP | 1470691 A2 | 10/2004 |
| WO | 2009029606 A2 | 3/2009 |
| WO | 2017160770 A1 | 9/2017 |

OTHER PUBLICATIONS

Extended European Search Report for Application No. EP19163028. 4, dated Jun. 17, 2019, 9 pages.
Extended European Search Report for Application No. EP23162944. 5, dated Jun. 13, 2023, 8 pages.

* cited by examiner

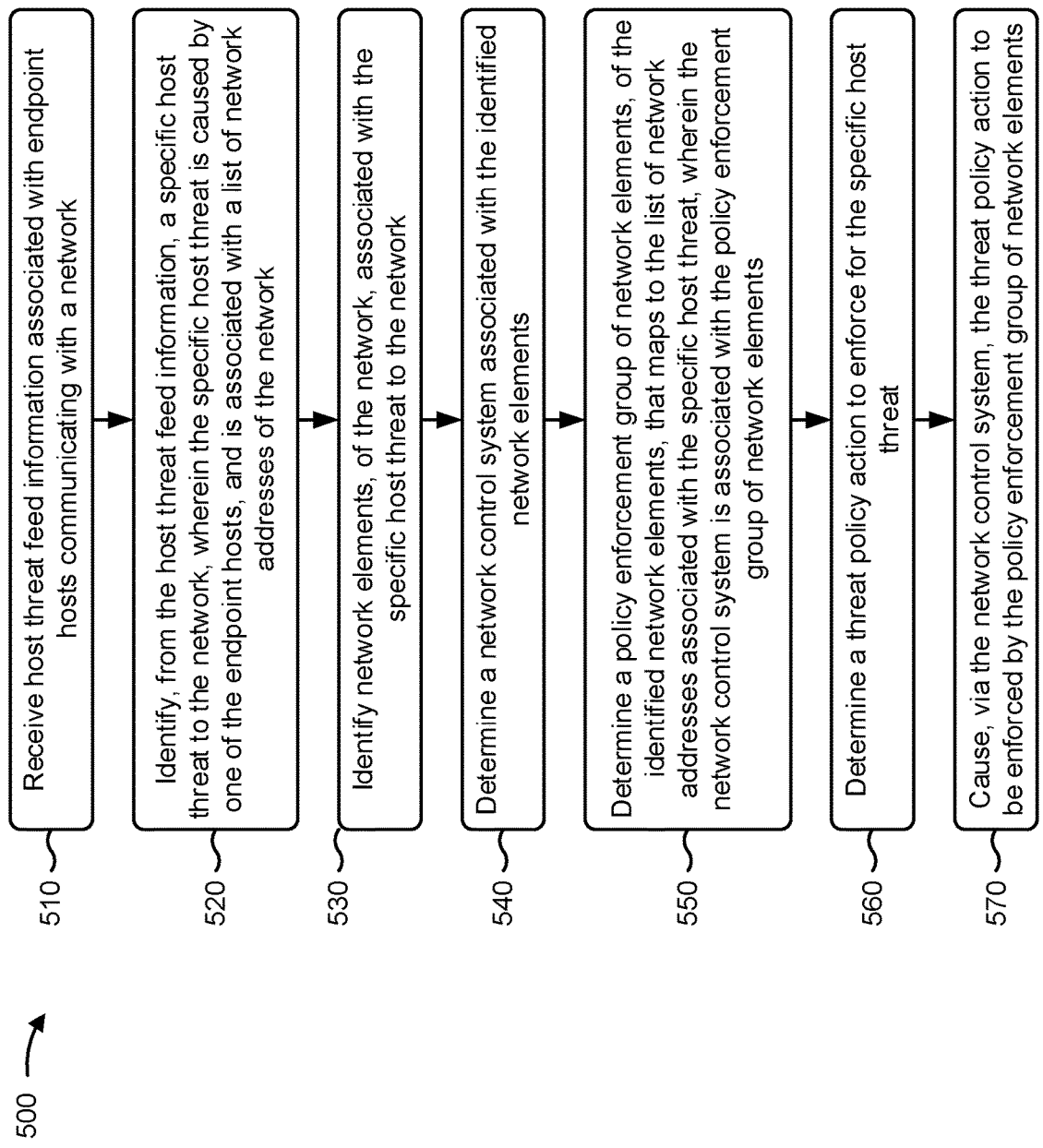

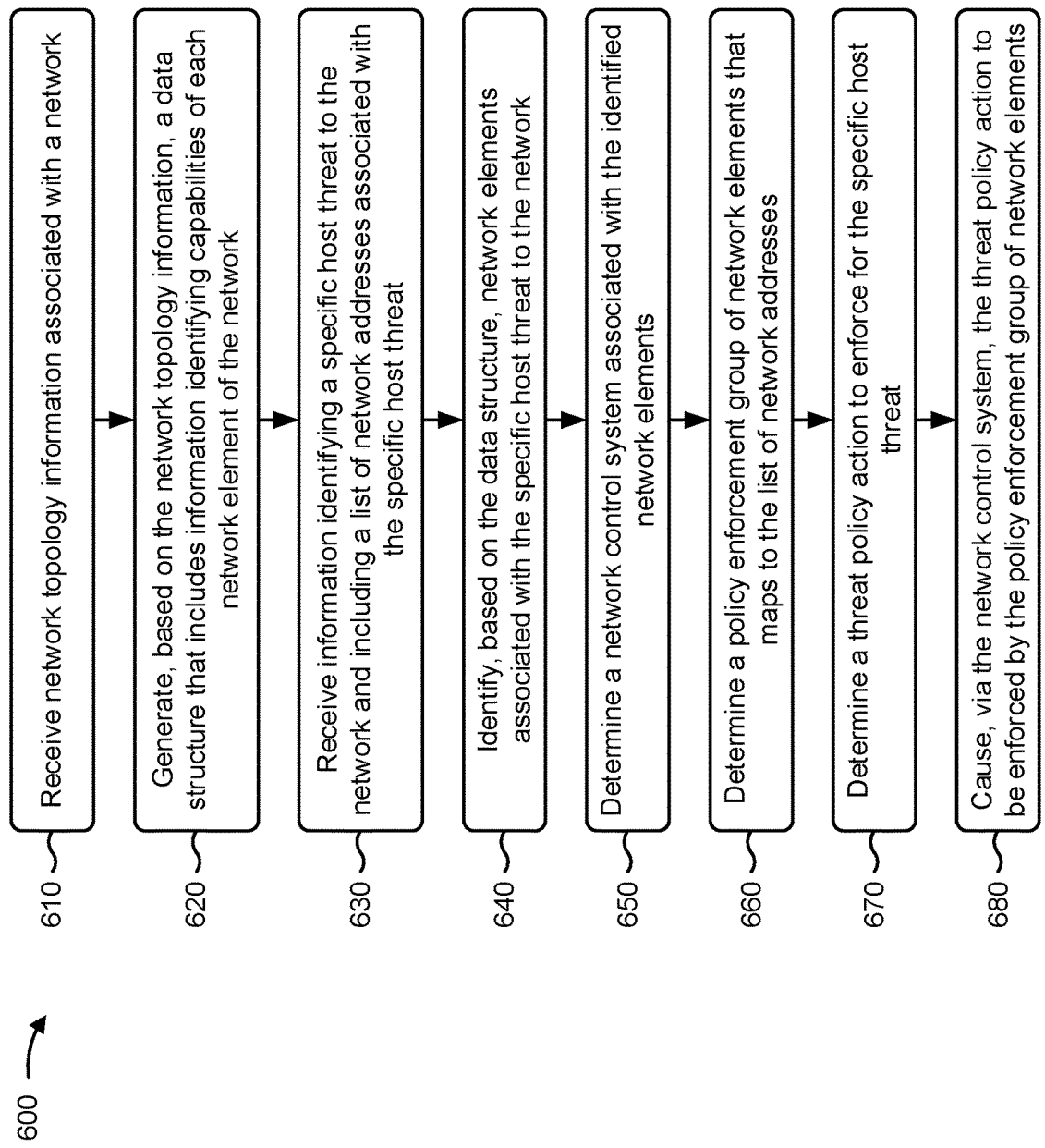

ENFORCING THREAT POLICY ACTIONS BASED ON NETWORK ADDRESSES OF HOST THREATS

RELATED APPLICATIONS

This application is a continuation of U.S. patent application Ser. No. 16/024,308, filed Jun. 29, 2018, which claims priority under 35 U.S.C. § 119 to U.S. Provisional Patent Application Nos. 62/647,431 and 62/647,460, filed on Mar. 23, 2018, the contents of which are incorporated by reference herein in their entireties.

BACKGROUND

As malware becomes more sophisticated, threat prevention solutions may provide sufficient threat detection to enforce infected endpoint host security controls at a perimeter of a network. However, given adaptive network changes where threats are injected both from external endpoint host threats and internal endpoint host threats, security controls at the perimeter of the network may be insufficient. For example, an endpoint host threat, blocked at a perimeter of a network, that connected to the network at a specific network segment may bypass security controls when the endpoint host threat laterally moves to a different network segment, a different campus, a different site, and/or the like because a network address (e.g., an Internet protocol (IP) address, a media access control (MAC) address, and/or the like) associated with the endpoint host threat may change.

SUMMARY

According to some implementations, a device may include one or more memories, and one or more processors to receive information identifying a specific host threat to a network, wherein the information may identify the specific host threat including a list of network addresses associated with the specific host threat. The one or more processors may identify network elements, of the network, associated with the specific host threat to the network, and may determine a network control system associated with the identified network elements. The one or more processors may determine a policy enforcement group of network elements, of the identified network elements, that maps to the list of network addresses associated with the specific host threat, wherein the network control system may be associated with the policy enforcement group of network elements. The one or more processors may determine a threat policy action to enforce for the specific host threat, and may cause, via the network control system, the threat policy action to be enforced by the policy enforcement group of network elements.

According to some implementations, a non-transitory computer-readable medium may store instructions that include one or more instructions that, when executed by one or more processors of a device, cause the one or more processors to receive host threat feed information associated with endpoint hosts communicating with a network. The one or more instructions may cause the one or more processors to identify, from the host threat feed information, a specific host threat to the network, wherein the specific host threat may be caused by one of the endpoint hosts, and the specific host threat may be associated with a list of network addresses of the network. The one or more instructions may cause the one or more processors to identify network elements, of the network, associated with the specific host threat to the network, and determine a network control system associated with the identified network elements. The one or more instructions may cause the one or more processors to determine a policy enforcement group of network elements, of the identified network elements, that maps to the list of network addresses associated with the specific host threat, wherein the network control system may be associated with the policy enforcement group of network elements. The one or more instructions may cause the one or more processors to determine a threat policy action to enforce for the specific host threat, and cause, via the network control system, the threat policy action to be enforced by the policy enforcement group of network elements.

According to some implementations, a method may include receiving network topology information associated with a network, and generating, based on the network topology information, a data structure that includes information identifying capabilities of each network element of the network. The method may include receiving information identifying a specific host threat to the network, wherein the information identifying the specific host threat may include a list of network addresses associated with the specific host threat. The method may include identifying, based on the data structure, network elements associated with the specific host threat to the network, and determining a network control system associated with the identified network elements. The method may include determining a policy enforcement group of network elements, of the identified network elements, that maps to the list of network addresses associated with the specific host threat, wherein the network control system may be associated with the policy enforcement group of network elements. The method may include determining a threat policy action to enforce for the specific host threat, and causing, via the network control system, the threat policy action to be enforced by the policy enforcement group of network elements.

BRIEF DESCRIPTION OF THE DRAWINGS

FIG. 5 is a flow chart of an example process for enforcing threat policy actions based on network addresses of host threats.

FIG. 6 is a flow chart of an example process for enforcing threat policy actions based on network addresses of host threats.

DETAILED DESCRIPTION

The following detailed description of example implementations refers to the accompanying drawings. The same reference numbers in different drawings may identify the same or similar elements.

Threat remediation systems that are not aware of mobility of an underlying endpoint host threat in the network introduce several challenges. For example, threat identification is limited to detection in a data path of an endpoint host threat communicating with a network through a perimeter network device, lateral propagation of the endpoint host threat inside the network cannot be detected and cannot be contained from further spreading, and once the endpoint host threat moves to a different network segment, the endpoint host threat may gain additional access and privileges to compromise an unprotected network segment. As a result, threat remediation systems are unable to monitor, identify, and remediate endpoint host threats consistently and effectively in real-time across an entire network.

Some implementations described herein provide a policy enforcer platform that enforces threat policy actions based on network addresses of host threats. For example, the policy enforcer platform may receive information identifying a specific host threat to a network and including a list of network addresses associated with the specific host threat. The policy enforcer platform may identify network elements, of the network, associated with the specific host threat to the network, and may determine a network control system associated with the identified network elements. The policy enforcer platform may determine a policy enforcement group of network elements, of the identified network elements, that maps to the list of network addresses associated with the specific host threat, and the network control system may be associated with the policy enforcement group of network elements. The policy enforcer platform may determine a threat policy action to enforce for the specific host threat, and may cause, via the network control system, the threat policy action to be enforced by the policy enforcement group of network elements.

Figure 1A:
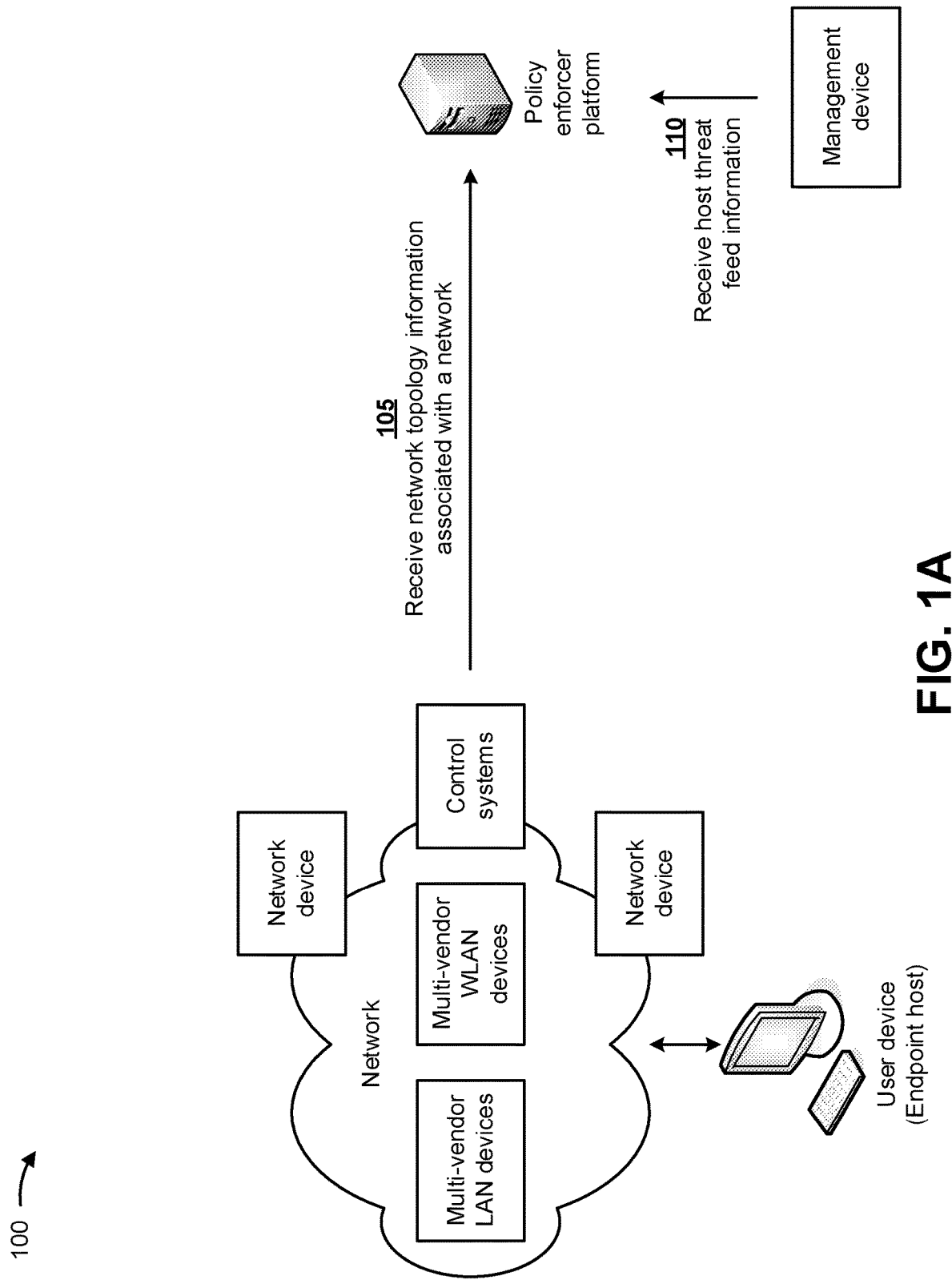
FIGS. 1A-1K are diagrams of an example implementation described herein.

FIGS. 1A-1K are diagrams of an example implementation 100 described herein. As shown in FIG. 1A, a user device (e.g., an endpoint host) may be associated with a network, a policy enforcer platform, and a management device. As further shown in FIG. 1A, the network may include local area network (LAN) devices possibly provided by multiple, different vendors (e.g., multi-vendor LAN devices), wireless local area network (WLAN) devices possible provided by multiple, different vendors (e.g., multi-vendor WLAN devices), network devices possibly provided by multiple, different vendors, and/or network control systems possibly provided by multiple, different vendors (e.g., control systems). In some implementations, each control system may control and/or manage a network segment of the network. For example, a control system associated with a particular vendor may control a network segment with devices associated with the particular vendor.

As further shown in FIG. 1A, and by reference number 105, the policy enforcer platform may receive, from one or more of the control systems, network topology information associated with the network. In some implementations, the network topology information may include information identifying the devices (e.g., the multi-vendor LAN devices, the multi-vendor WLAN devices, the network devices, the control systems, the endpoint hosts, and/or the like) associated with the network. For example, the network topology information may include information identifying manufacturers, models, device identifiers, throughputs, bandwidths, network addresses, and/or the like of the devices associated with the network, information identifying hardware provided in the devices associated with the network, information identifying software provided in the devices associated with the network, and/or the like.

As further shown in FIG. 1A, and by reference number 110, the policy enforcer platform may receive, from the management device, host threat feed information associated with the network. In some implementations, the management device may include a security information and event management (SIEM) device that combines security information management (SIM) and security event management (SEM) and provides real-time analysis of security alerts generated by applications and devices associated with the network. In some implementations, the host threat feed information may include information identifying threat feeds (e.g., feeds provided by endpoint hosts and including threats) associated with the network. In some implementations, the host threat feed information may include information identifying network addresses (e.g., IP addresses) associated with the threat feeds.

Figure 1B:
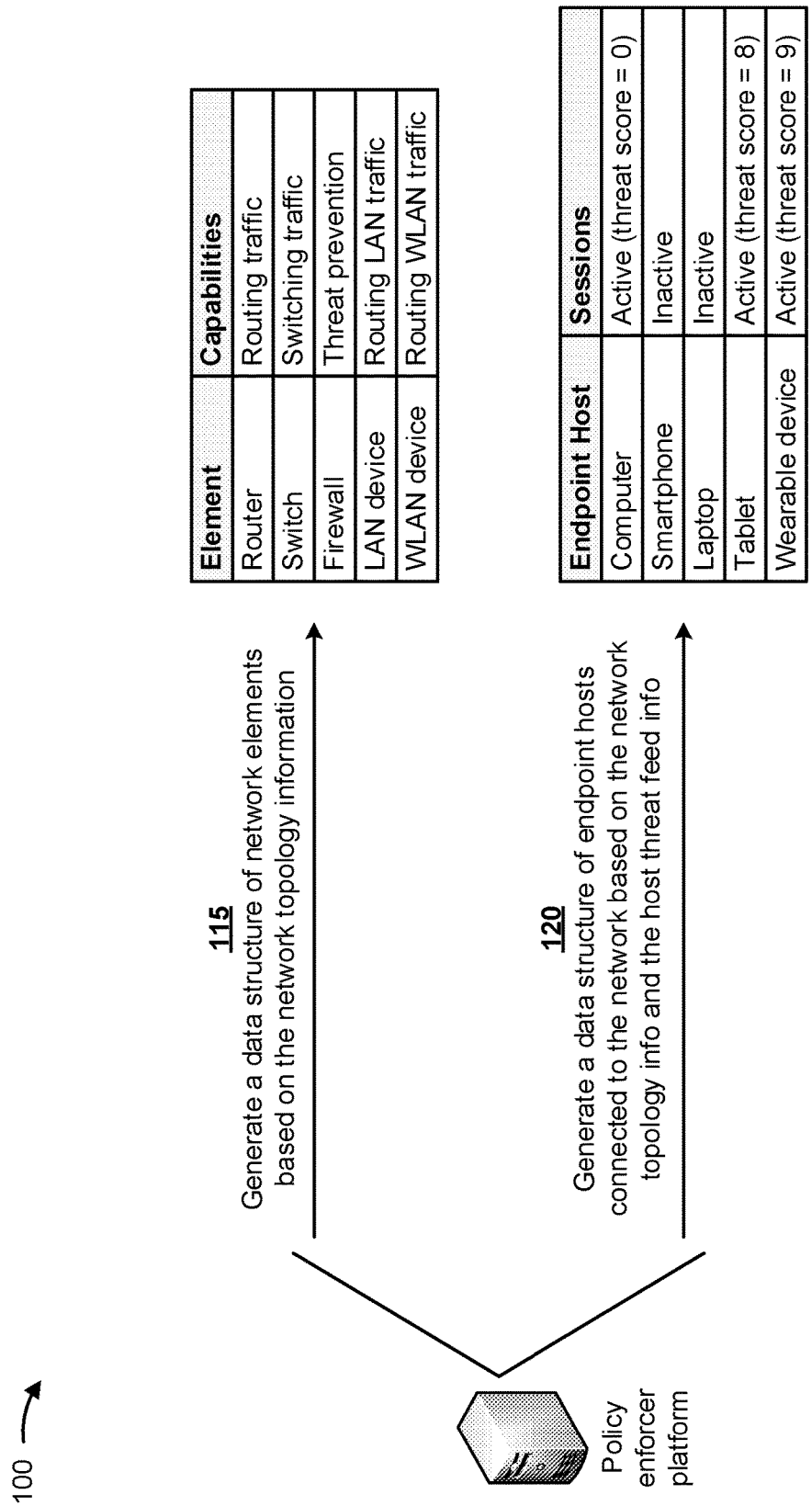

As shown in FIG. 1B, and by reference number 115, the policy enforcer platform may generate a data structure (e.g., a database, a table, a list, and/or the like), that includes information identifying network elements (e.g., the multi-vendor LAN devices, the multi-vendor WLAN devices, the network devices, the control systems, the endpoint hosts, and/or the like) associated with the network, based on the network topology information. In some implementations, the data structure may include the network topology information associated with the network elements, as described above. In some implementations, the policy enforcer platform may utilize the network topology information to determine capabilities associated with the network elements, and may store information identifying the capabilities associated with the network elements in the data structure. For example, as further shown in FIG. 1B, the data structure may include information identifying network elements (e.g., a router, a switch, a firewall, a LAN device, a WLAN device, and/or the like), information identifying capabilities of the network elements (e.g., routing traffic, switching traffic, threat prevention, routing LAN traffic, routing WLAN traffic, and/or the like), and/or the like. In some implementations, the data structures, described herein, may be stored in a memory associated with the policy enforcer platform.

In some implementations, the policy enforcer platform may utilize the network topology information to determine capabilities associated with the network elements by analyzing the network topology information, and determining hardware, software, models, throughputs, bandwidths, network addresses, and/or the like of the devices associated with the network based on the analyzing the network topology information. The policy enforcer platform may determine the capabilities associated with the network elements based on the hardware, software, models, throughputs, bandwidths, network addresses, and/or the like of the devices associated with the network.

In some implementations, the policy enforcer platform may process the network topology information, with one or more artificial intelligence models, to determine the capabilities associated with the network elements. In some implementations, the one or more artificial intelligence models may include one or more of a support vector machine model, an artificial neural network model, a data mining model, a pattern discovery model, and/or the like.

A support vector machine model may include a supervised learning model with one or more associated learning algorithms that analyze data used for classification and regression analysis. Given a set of training examples, each training example being marked as belonging to one or the other of two categories, a training method of the support vector machine model builds a model that assigns new examples to one category or the other. The support vector machine model is a representation of examples as points in space, mapped so that the examples of separate categories are divided by a clear gap that is as wide as possible. New examples are then mapped into that same space and predicted to belong to a category based on which side of the gap they fall.

An artificial neural network model may include a model that uses an artificial neural network (e.g., to determine the capabilities associated with the network elements). An artificial neural network utilizes a collection of connected units or nodes called artificial neurons. Each connection between artificial neurons can transmit a signal from one artificial neuron to another artificial neuron. The artificial neuron that receives the signal can process the signal and then provide a signal to artificial neurons to which it is connected. Artificial neurons and connections typically have a weight that adjusts as learning proceeds. The weight may increase or decrease the strength of the signal at a connection. Additionally, an artificial neuron may have a threshold such that the artificial neuron only sends a signal if the aggregate signal satisfies the threshold. Typically, artificial neurons are organized in layers, and different layers may perform different kinds of transformations on their inputs.

A data mining model may include a model that performs anomaly detection (e.g., outlier, change, and/or deviation detection) to identify unusual data records of interest or data errors that require further investigation, association rule learning (e.g., dependency modeling) to search for relationships between variables, clustering to discover groups and/or structures in data that are similar without using known structures in the data, classification to generalize known structure to apply to new data, regression to identify a function that models the data with the least error, summarization to provide a more compact representation of the data set, including visualization and report generation, and/or the like.

A pattern discovery model may include a data mining technique, such as sequential pattern mining. Sequential pattern mining is a type of structured data mining that seeks to identify statistically relevant patterns between data examples where the values are delivered in a sequence. Sequential pattern mining may be classified as string mining (e.g., which is based on string processing models), and/or item set mining (e.g., which is based on association rule learning). String mining deals with a limited alphabet for items that appear in a sequence, but where the sequence itself may be very long. Item set mining deals with discovering frequent item sets, and an order in which the frequent item sets appear.

In some implementations, the policy enforcer platform may utilize one or more of the artificial intelligence models, and may utilize best results determined by one of the artificial intelligence models. In some implementations, the policy enforcer platform may utilize a plurality of the artificial intelligence models, and may aggregate the results determined by the plurality of artificial intelligence models.

As further shown in FIG. 1B, and by reference number 120, the policy enforcer platform may generate a data structure (e.g., a database, a table, a list, and/or the like) that includes information identifying endpoint hosts (e.g., the user devices) connected to the network, based on the network topology information and/or the host threat feed information. In some implementations, the data structure may include the network topology information associated with the endpoint hosts, described above. In some implementations, the policy enforcer platform may utilize the network topology information and/or the host threat feed information to determine sessions associated with the endpoint hosts, and may store information identifying the sessions associated with the endpoint hosts in the data structure. For example, as further shown in FIG. 1B, the data structure may include information identifying endpoint hosts (e.g., a computer, a smartphone, a laptop, a tablet, a wearable device, and/or the like), information identifying sessions of the endpoint hosts (e.g., active, inactive, and/or the like), information identifying threat scores associated with the sessions (e.g., based on a threat scale from zero to ten, where a zero indicates no threat and a ten indicates a greatest threat), and/or the like. In some implementations, the threat scores may be provided by the host threat feed information.

Figure 1C:
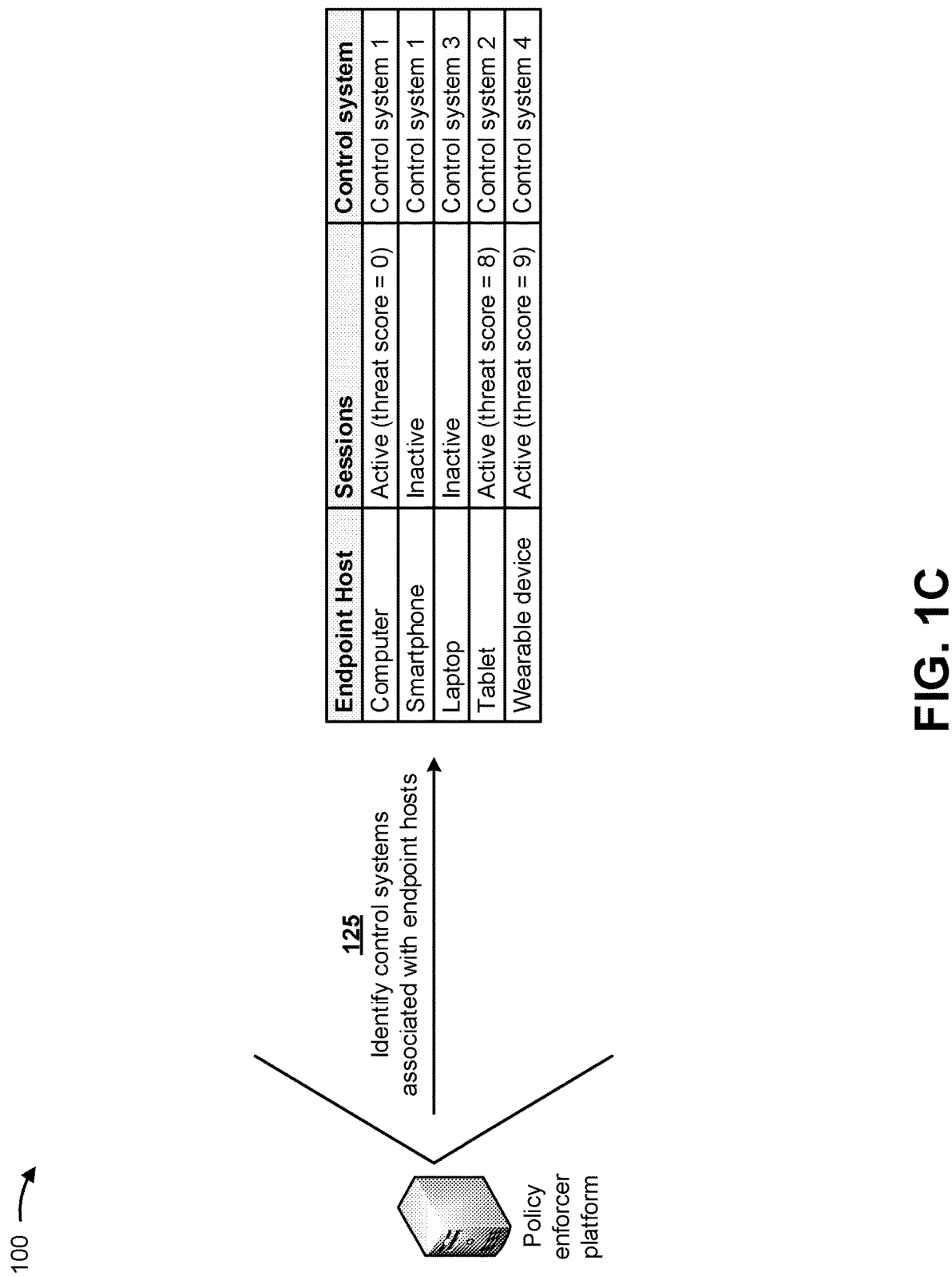

As shown in FIG. 1C, and by reference number 125, the policy enforcer platform may identify control systems associated with the endpoint hosts of the data structure that includes information identifying endpoint hosts (e.g., as shown in FIG. 1B). In some implementations, the policy enforcer platform may utilize network addresses (e.g., IP addresses) of the endpoint hosts to match each endpoint host with a specific network segment. In such implementations, the policy enforcer platform may determine (e.g., based on the network topology information) which control system is associated with (e.g., manages) each specific network segment, and, accordingly, may identify control systems associated with the endpoint hosts. In some implementations, the policy enforcer platform may add information identifying associated control systems to the data structure that includes information identifying endpoint hosts. For example, as further shown in FIG. 1C, control system 1 may be associated with the computer and the smartphone, control system 2 may be associated with the tablet, control system 3 may be associated with the laptop, and control system 4 may be associated with the wearable device.

Figure 1D:
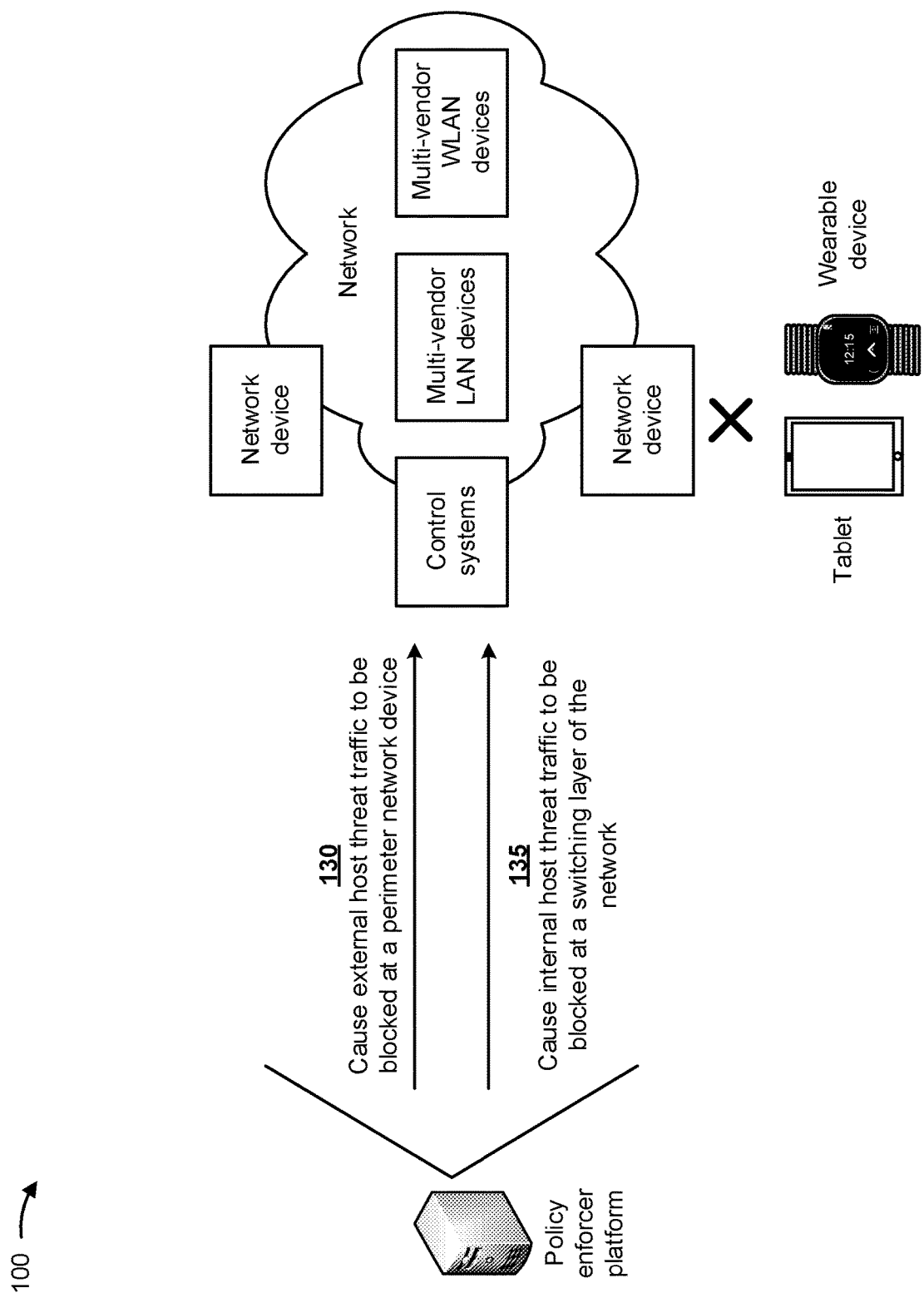

With reference to FIG. 1D, in some implementations and based on the host threat feed information (e.g., based on threat scores associated with host threat feeds), the policy enforcer may orchestrate threat enforcement actions by blocking endpoint host traffic at perimeter network devices (e.g., firewalls) of the network for external host threat traffic (e.g., north-south communications) provided between the LAN devices and/or the WLAN devices, the network devices, and the endpoint hosts. Additionally, or alternatively, the policy enforcer may orchestrate threat enforcement actions by blocking endpoint host traffic at a switching layer of the network for internal host threat traffic (e.g., east-west communications) provided among the LAN devices and/or among the WLAN devices.

As shown in FIG. 1D, and by reference number 130, the policy enforcer platform may cause the external host threat traffic to be blocked at a perimeter network device of the network. In some implementations, the policy enforcer platform may provide, to a control system associated with the perimeter network device, information indicating that the perimeter network device is to block the external host threat traffic. In such implementations, the control system may provide, to the perimeter network device, instructions to block the external host threat traffic. The perimeter network device may receive the instructions, and may block the external host threat traffic based on the instructions. For example, since the tablet and the wearable device have active sessions with threat scores of eight and nine, respectively (e.g., as shown in FIG. 1C), the policy enforcer platform may determine that the tablet and the wearable device represent external host threat traffic, and may cause the perimeter network device associated with the tablet and the wearable device to block traffic received from the tablet and the wearable device, as further shown in FIG. 1D.

As further shown in FIG. 1D, and by reference number 135, the policy enforcer platform may cause the internal host threat traffic to be blocked at a switching layer of the network. In some implementations, the policy enforcer platform may provide, to a control system associated with the switching layer (e.g., communications among LAN devices and/or WLAN devices), information indicating that the LAN devices and/or the WLAN devices are to block the internal host threat traffic. In such implementations, the control system may provide, to the LAN devices and/or the WLAN devices, instructions to block the internal host threat traffic. The LAN devices and/or the WLAN devices may receive the instructions, and may block the internal host threat traffic based on the instructions. For example, the policy enforcer platform may determine that the tablet and the wearable device generated internal host threat traffic in a LAN and/or a WLAN, and may cause the LAN devices and/or the WLAN devices associated with the LAN and/or the WLAN to block such traffic.

Figure 1E:
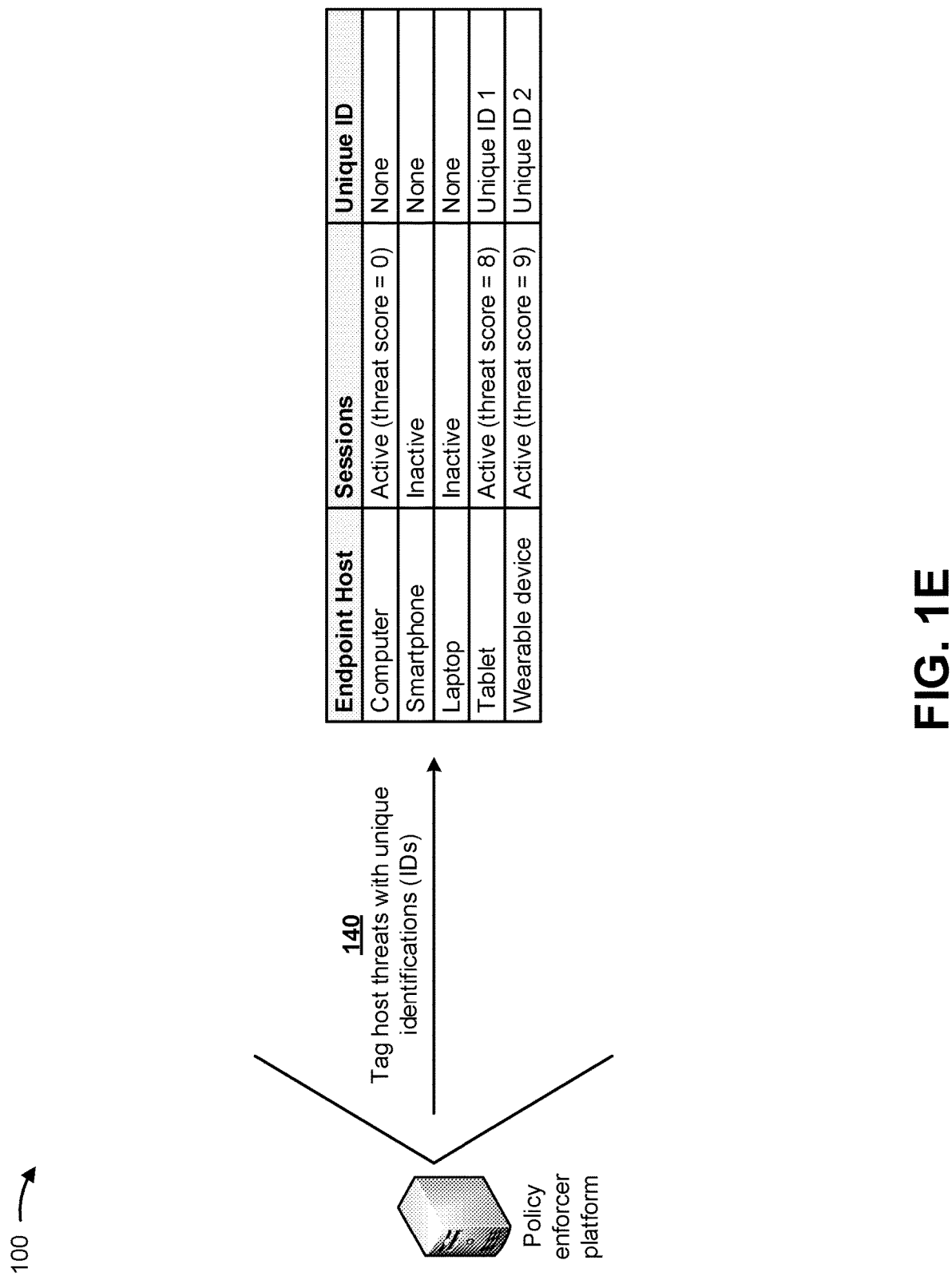

As shown in FIG. 1E, and by reference number 140, the policy enforcer platform may tag host threats with unique identifications (IDs). In some implementations, each unique ID may include a MAC address associated with a network interface card (NIC) associated with an endpoint host that represents a threat, session information (e.g., user login session details) associated with the endpoint host that represents a threat, a device identifier (e.g., a model number, a serial number, and/or the like) associated with the endpoint host that represents a threat, a combination of the aforementioned, and/or the like. In this way, the endpoint host that represents a threat may be tracked by the policy enforcer platform even when the endpoint host is assigned a different network address (e.g., IP address) based on where and how the endpoint host reattaches to a new network segment after a migration (e.g., a lateral migration) through the network.

In some implementations, as further shown in FIG. 1E, the policy enforcer platform may tag only those endpoint hosts that represent threats with the unique IDs. For example, since the tablet and the wearable device have active sessions with threat scores of eight and nine, respectively (e.g., as shown in FIG. 1C), the policy enforcer platform may tag the tablet and the wearable device with unique IDs (e.g., unique ID 1 and unique ID 2, respectively). This way the policy enforcer platform may track movement of the tablet and the wearable device through the network. In some implementations, the policy enforcer platform may add information identifying the unique IDs to the data structure that includes information identifying endpoint hosts and the sessions associated with the endpoint hosts (e.g., as shown in FIG. 1B).

Figure 1F:
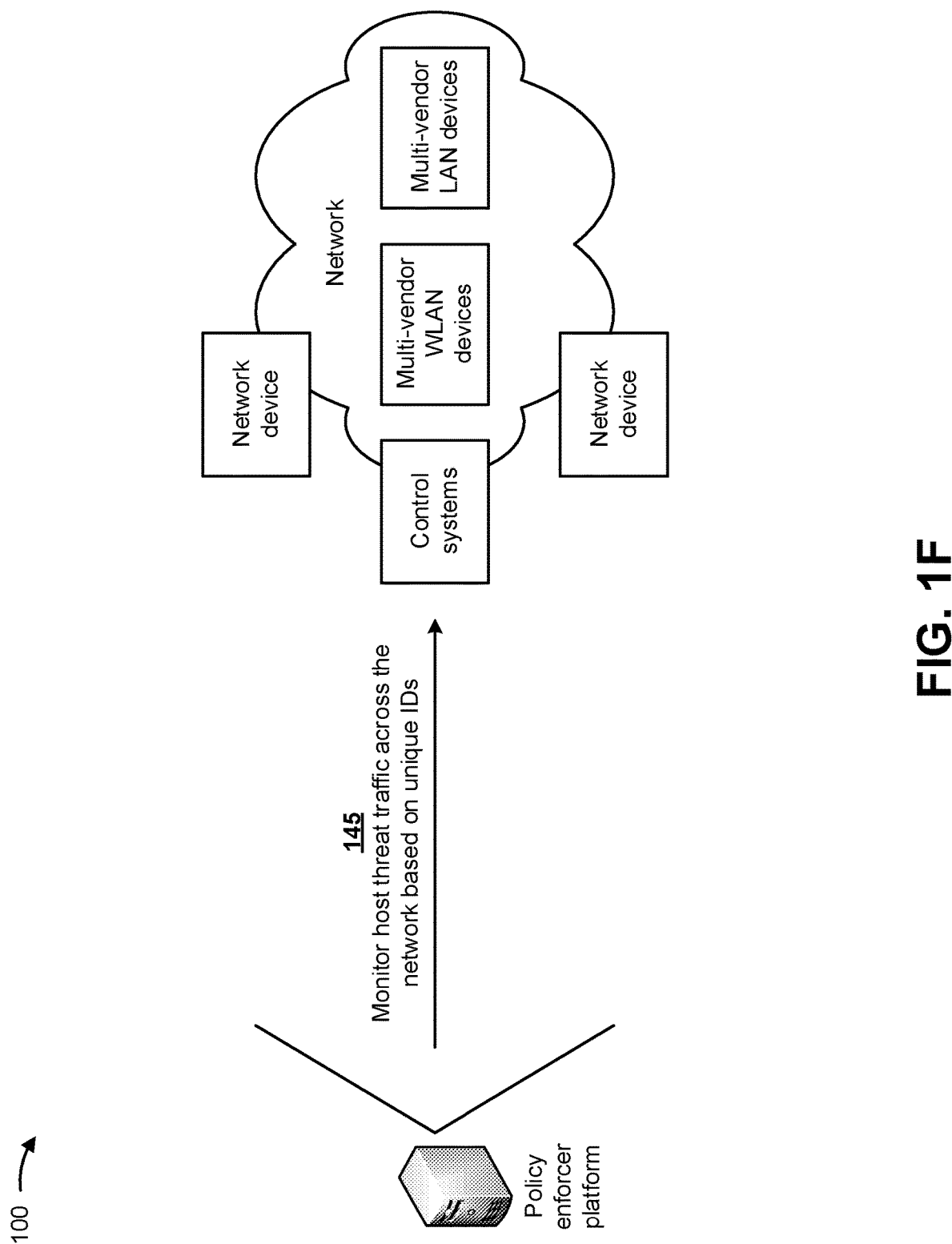

As shown in FIG. 1F, and by reference number 145, the policy enforcer platform may monitor the host threat traffic across the network based on the unique IDs. In some implementations, the policy enforcer may automate monitoring and tracking of lateral propagation of endpoint hosts that represent threats across the network, and may continue to enforce actions against the endpoint hosts that represent threats (e.g., may monitor and/or enforce actions with respect to wired to wireless to wired session migrations and/or multi-vendor network segments). In some implementations, the policy enforcer may perform actions related to tracking and/or policy orchestration of endpoint hosts that represent threats based on tagging the endpoint hosts that represent threats with the unique IDs. The unique IDs may enable the policy enforcer platform to track an endpoint host that represents a threat even when the endpoint host is assigned a different network address (e.g., IP address) based on where and how the endpoint host reattaches to a new network segment after a migration through the network.

Figure 1G:
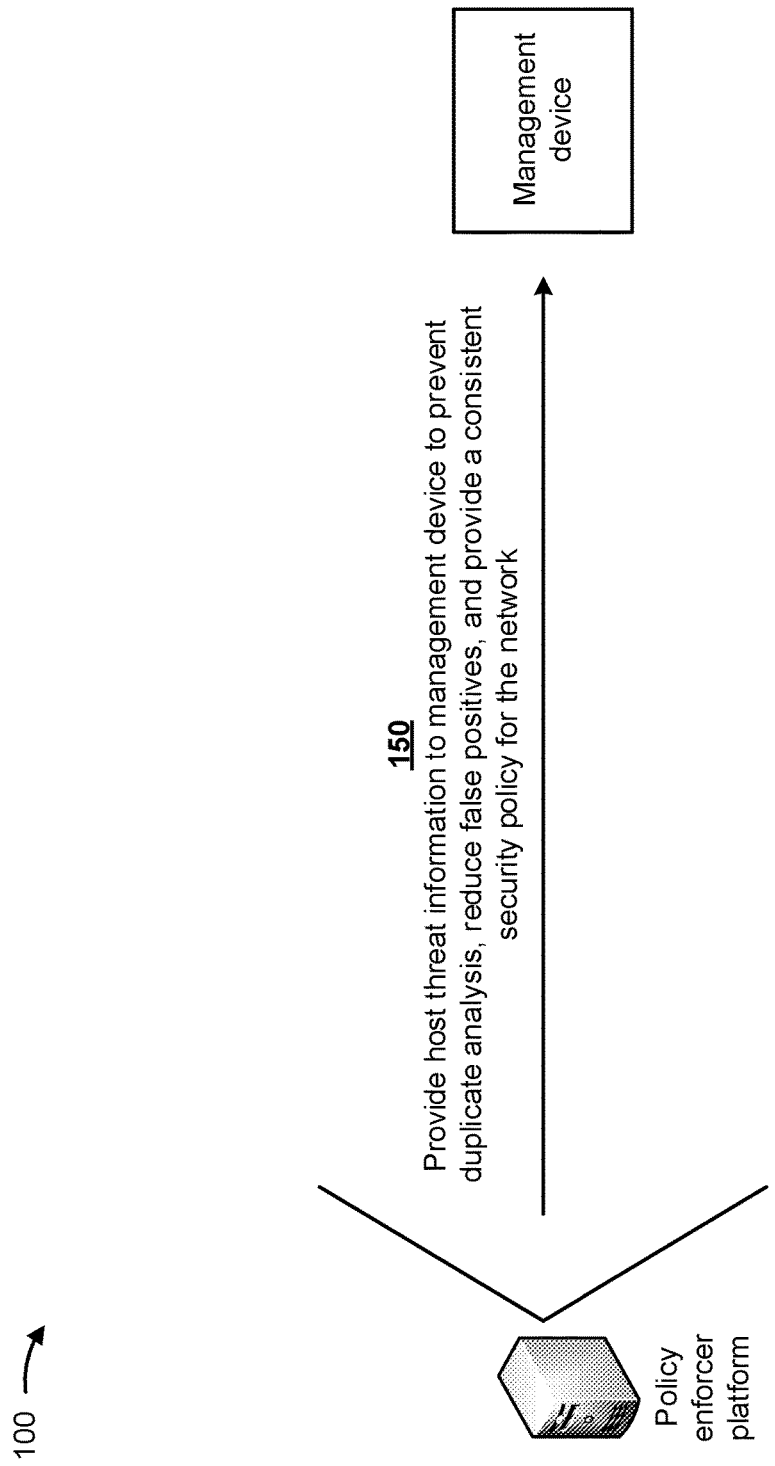

As shown in FIG. 1G, and by reference number 150, the policy enforcer platform may provide host threat information to the management device to mitigate duplicate analysis by the management device, to reduce false positive identification of endpoint hosts as threats by the management device, to provide a consistent security posture for the entire network, and/or the like. In some implementations, since the management device may monitor the network and enforce security policies for the network, the policy enforcer platform may provide, to the management device, the host threat information determined by the policy enforcer platform. In some implementations, the host threat information may include the information determined based on monitoring the host threat traffic across the network based on the unique IDs, as described above in connection with FIG. 1F.

Figure 1H:
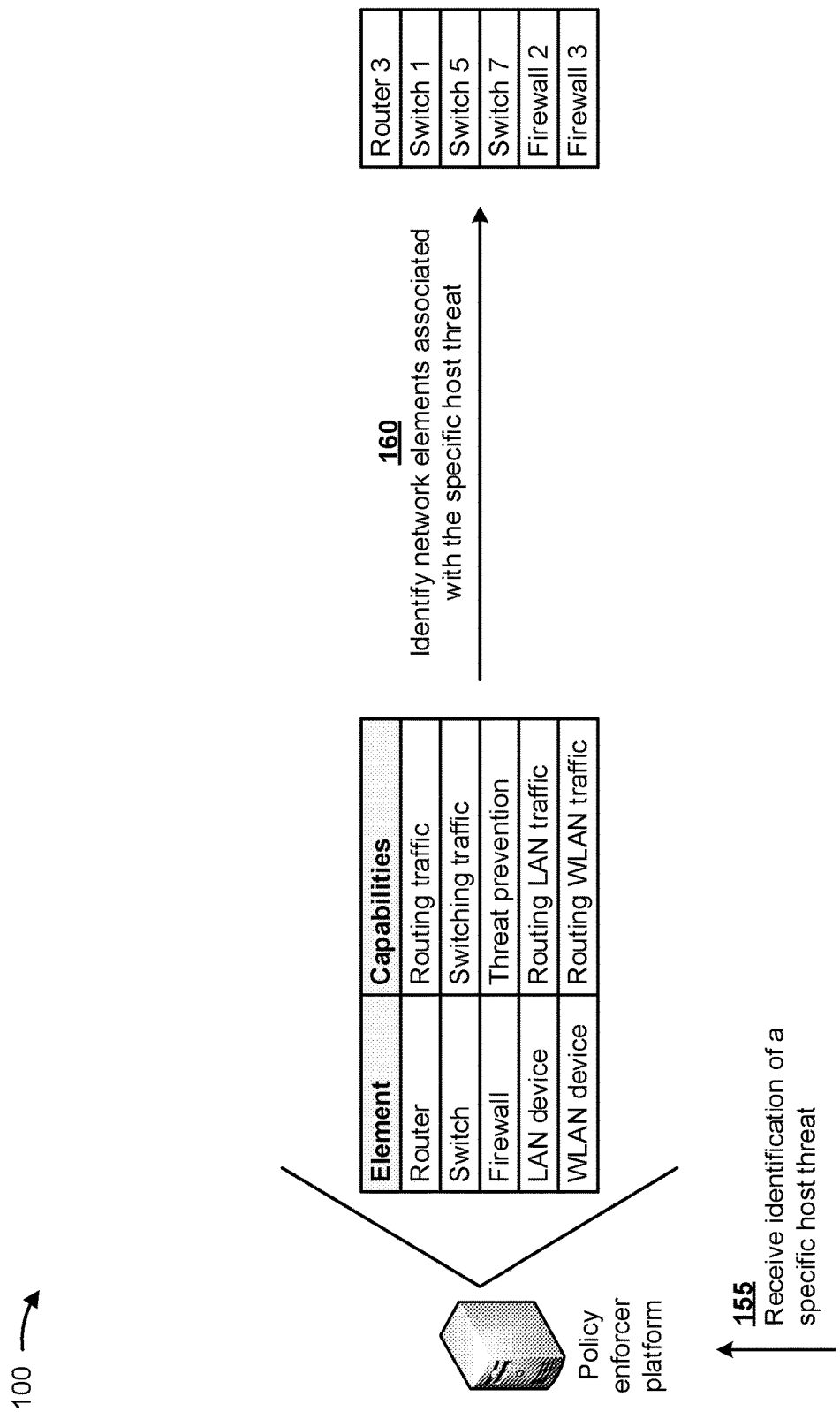

As shown in FIG. 1H, and by reference number 155, the policy enforcer platform may receive information identifying a specific host threat associated with a particular endpoint host. In some implementations, the policy enforcer platform may provide security policy orchestration for the specific host threat generated by the particular endpoint host in order to deliver a consistent security posture for the network. In some implementations, the information identifying the specific host threat may include a list of network addresses (e.g., IP addresses) associated with the specific host threat since the specific host threat may receive multiple network addresses as the specific host threat migrates through the network.

As further shown in FIG. 1H, and by reference number 160, the policy enforcer platform may identify network elements associated with the specific host threat. In some implementations, the policy enforcer platform may utilize the network topology information to identify the network elements associated with the specific host threat. For example, based on the network topology information and a unique ID associated with the specific host threat, the policy enforcer platform may identify network elements (e.g., router 3, switch 1, switch 5, switch 7, firewall 2, and firewall 3) as network elements associated with the unique ID and the specific host threat. In some implementations, the policy enforcer platform may utilize a unique ID associated with the specific host threat to identify the network elements associated with the specific host threat by determining which network elements processed the unique ID.

Figure 1I:
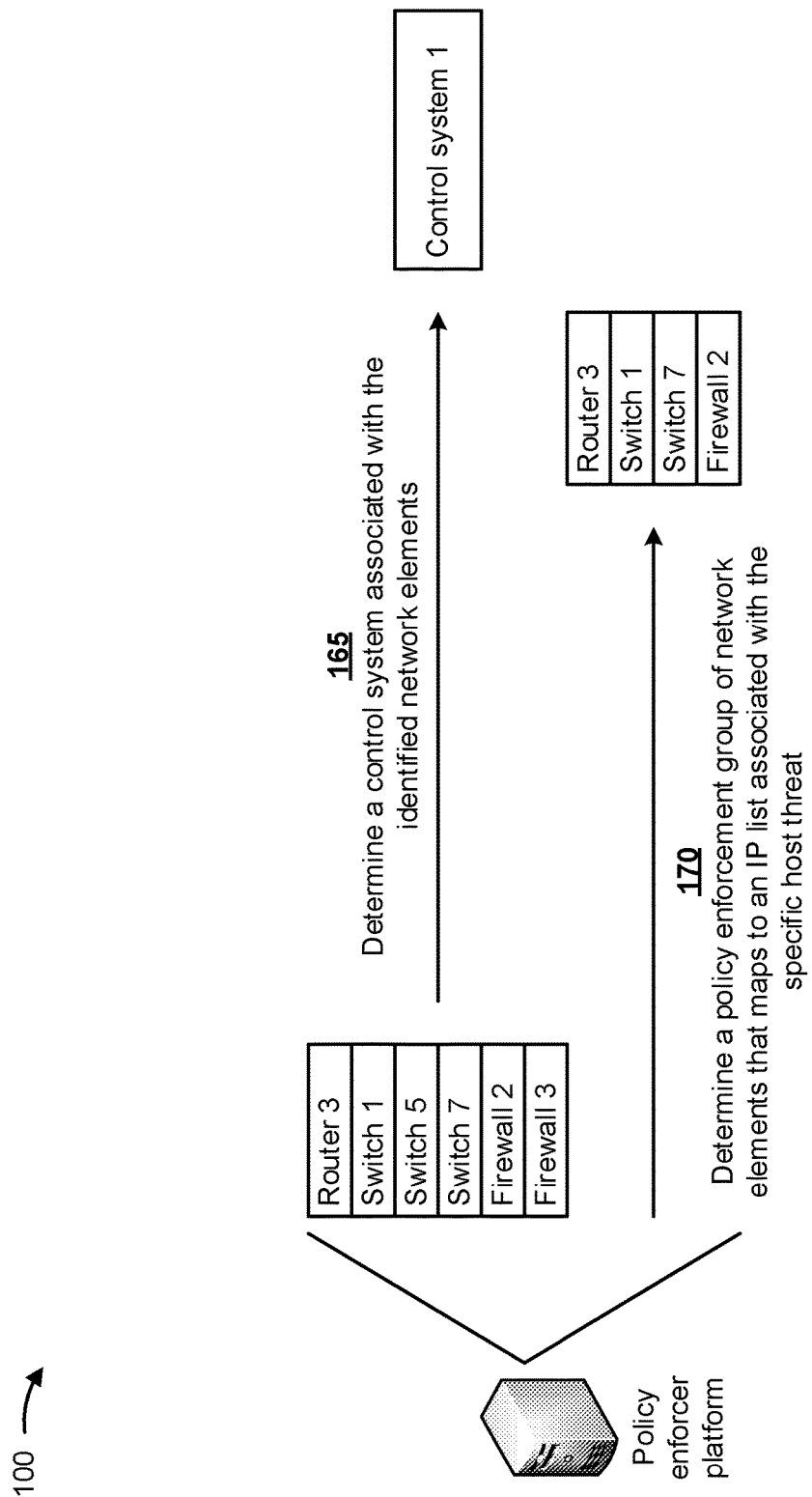

As shown in FIG. 1I, and by reference number 165, the policy enforcer platform may determine a control system associated with the network elements identified as being associated with the specific host threat. In some implementations, the control system associated with the identified network elements may enforce a host threat policy (e.g., a threat policy action) to combat the specific host threat. In some implementations, the policy enforcer platform may utilize the network topology information to determine the control system associated with the identified network elements. For example, as further shown in FIG. 1I and based on the network topology information, the policy enforcer platform may determine that control system 1 is associated with router 3, switch 1, switch 5, switch 7, firewall 2, and firewall 3. In some implementations, the specific host threat may be associated with other network elements associated with other control systems. In such implementations, the policy enforcer platform may determine multiple control systems associated with the network elements identified as being associated with the specific host threat.

As further shown in FIG. 1I, and by reference number 170, the policy enforcer platform may determine a policy enforcement group of network elements, from the identified network elements, that maps to the list of network addresses (e.g., IP addresses) associated with the specific host threat. In some implementations, the policy enforcer platform may determine, for IP addresses in the list and for an IP subnet-based policy enforcement group, an IP address within a network subnet mask (e.g., that was discovered for the identified control system). In such implementations, the policy enforcer platform may map the network subnet mask to a layer 3 (e.g., of the open source interconnection (OSI) model) network device (e.g., configured with integrated routing and bridging (IRB) and/or virtual LAN (VLAN) extensions). In some implementations, the policy enforcer platform may determine whether the network subnet mask has a policy that is available. In some implementations, for a location-based policy enforcement group, the policy enforcer platform may determine whether the identified network elements have a policy that is available. For example, as further shown in FIG. 1I, the policy enforcer platform may determine router 3, switch 1, switch 7, and firewall 2 as the policy enforcement group of network elements.

Figure 1J:
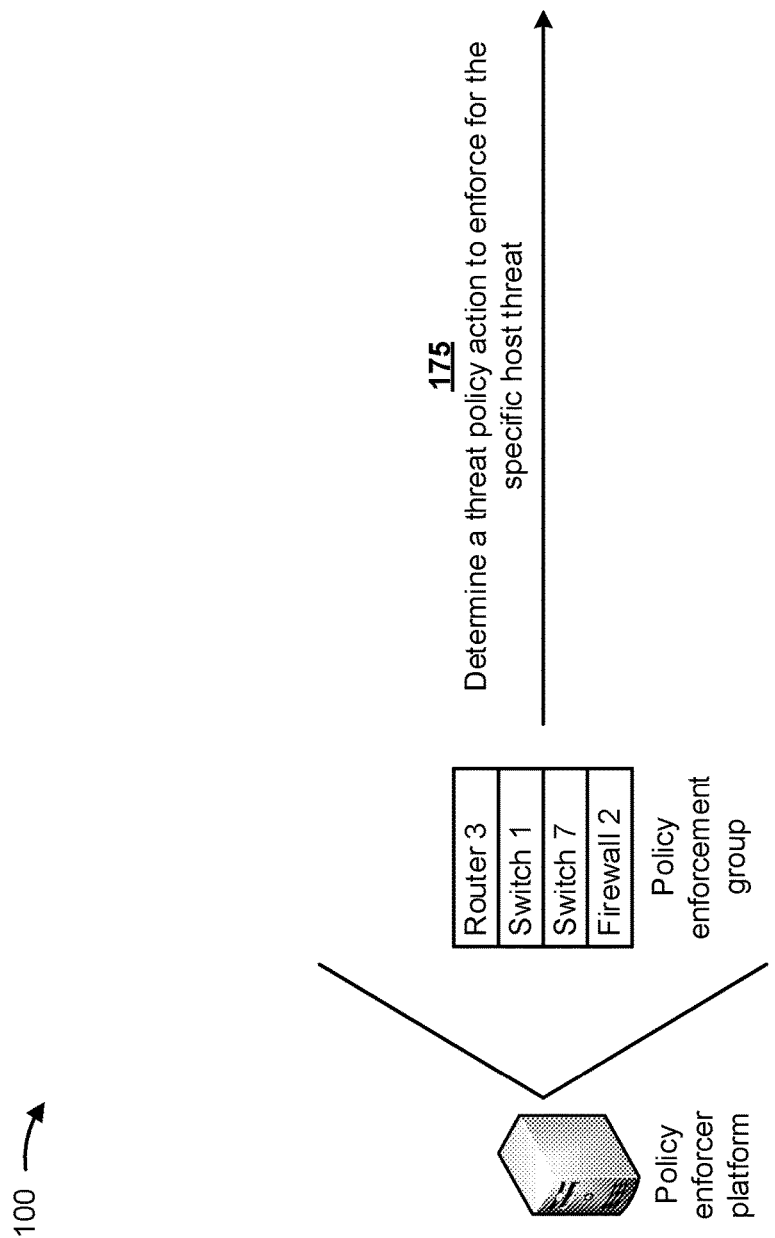

As shown in FIG. 1J, and by reference number 175, the policy enforcer platform may determine a threat policy action to enforce for the specific host threat. In some implementations, the policy enforcer platform may identify, from the policy enforcement group of network elements, whether a threat prevention policy exists, and may identify any threat profiles associated with the threat prevention policy. In such implementations, the policy enforcer platform may identify, for a threat profile associated with the specific host threat, a corresponding threat policy action to enforce. In some implementations, if the threat prevention policy exists, the policy enforcer platform may identify one or more threat policy actions associated with the threat prevention policy. In some implementations, if the threat prevention policy does not exist, the policy enforcer platform may create a new threat prevention policy (e.g., with threat policy actions) to combat the specific host threat.

Figure 1K:
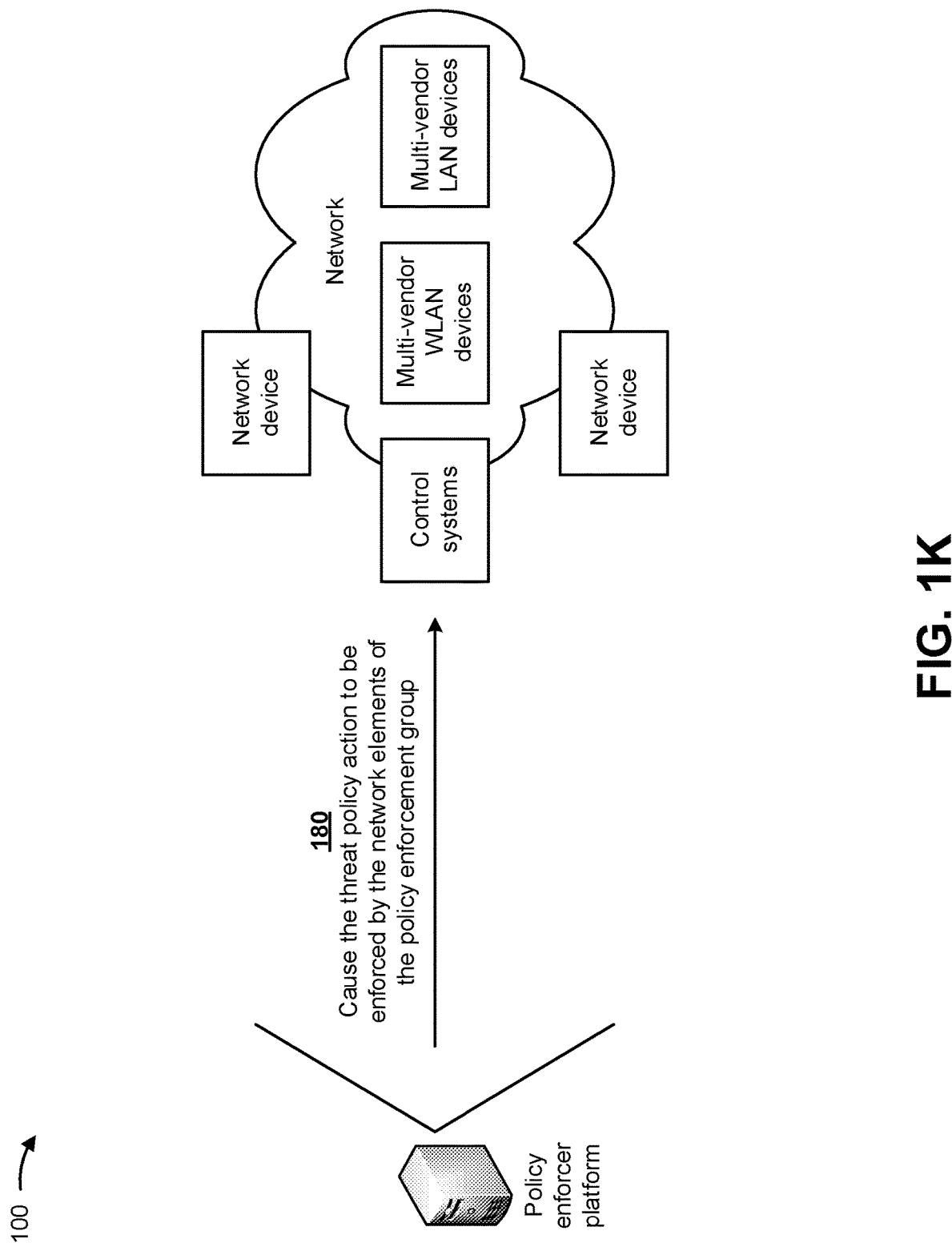

As shown in FIG. 1K, and by reference number 180, the policy enforcer platform may cause the threat policy action to be enforced by the network elements of the policy enforcement group. In some implementations, the policy enforcer platform may provide, to the control system associated with the network elements of the policy enforcement group, information indicating that the network elements of the policy enforcement group are to enforce the threat policy action to combat the specific host threat. In such implementations, the control system may provide, to the network elements of the policy enforcement group, instructions to enforce the threat policy action to combat the specific host threat. The network elements of the policy enforcement group may receive the instructions, and may enforce the threat policy action based on the instructions. For example, the policy enforcer platform may provide, to control system 1, information indicating that router 3, switch 1, switch 7, and firewall 2 are to enforce the threat policy action to combat the specific host threat. In such implementations, control system 1 may provide, to router 3, switch 1, switch 7, and firewall 2, instructions to enforce the threat policy action to combat the specific host threat. Router 3, switch 1, switch 7, and firewall 2 may receive the instructions, and may enforce the threat policy action based on the instructions. In some implementations, the threat policy action may include dropping traffic from the specific host threat, quarantining traffic from the specific host threat, logging traffic from the specific host threat for further analysis, redirecting traffic from the specific host threat to a device that may perform a deeper analysis of the specific host threat, and/or the like.

Some implementations described herein may relate to host threat movement issues in a multi-vendor network. Additionally, or alternatively, some implementations described herein may relate to host threat policy orchestration for a given IP feed generated by an endpoint host. Additionally, or alternatively, some implementations described herein may provide a way to uniquely identify an endpoint host in a network, such as when a host threat feed identifies, by IP address, multiple endpoint hosts with a same IP address as potentially risky (e.g., which may be needed for threat remediation).

Some implementations described herein may identify a particular endpoint host session (e.g., based on an IP address in a threat feed) in a particular network segment. Additionally, or alternatively, some implementations described herein may associate a particular policy action for an endpoint host group and may enforce the policy action on a particular control system. For example, a threat feed may identify an IP address as being a threat, and based on this IP address, some implementations described herein may identify a correct endpoint host for enforcing a policy action based on a unique ID for the endpoint host. In this way, some implementations described herein are capable of enforcing a policy action against an endpoint host, regardless of whether the IP address of the endpoint host has changed or will change (e.g., due to disconnecting from a network and reconnecting to the network, migrating through the network, etc.).

Additionally, or alternatively, in an enterprise network or a campus-branch deployment (e.g., where branch networks are configured with similar IP addressing schemes with overlapping IP addresses), the policy enforcer platform may create a secure group of network elements to uniquely associate with a branch network and may dynamically determine correct endpoint hosts to enforce threat remediation actions that match an IP address of a threat host feed for a specific secure group of network elements. This may prevent the policy enforcer platform from enforcing policy actions for an incorrect endpoint session when there are multiple endpoint sessions active for the same IP address.

In this way, several different stages of the process for enforcing threat policy actions based on network addresses of host threats may be automated, which may remove human subjectivity and waste from the process, and which may improve speed and efficiency of the process and conserve computing resources (e.g., processor resources, memory resources, and/or the like). Furthermore, implementations described herein use a rigorous, computerized process to perform tasks or roles that were not previously performed or were previously performed using subjective human intuition or input. For example, currently there does not exist a technique to enforce threat policy actions based on network addresses of host threats. Finally, automating the process for enforcing threat policy actions based on network addresses of host threats conserves computing resources (e.g., processor resources, memory resources, and/or the like) that would otherwise be wasted in attempting to combat host threats across a network.

As indicated above, FIGS. 1A-1K are provided merely as examples. Other examples are possible and may differ from what was described with regard to FIGS. 1A-1K.

Figure 2:
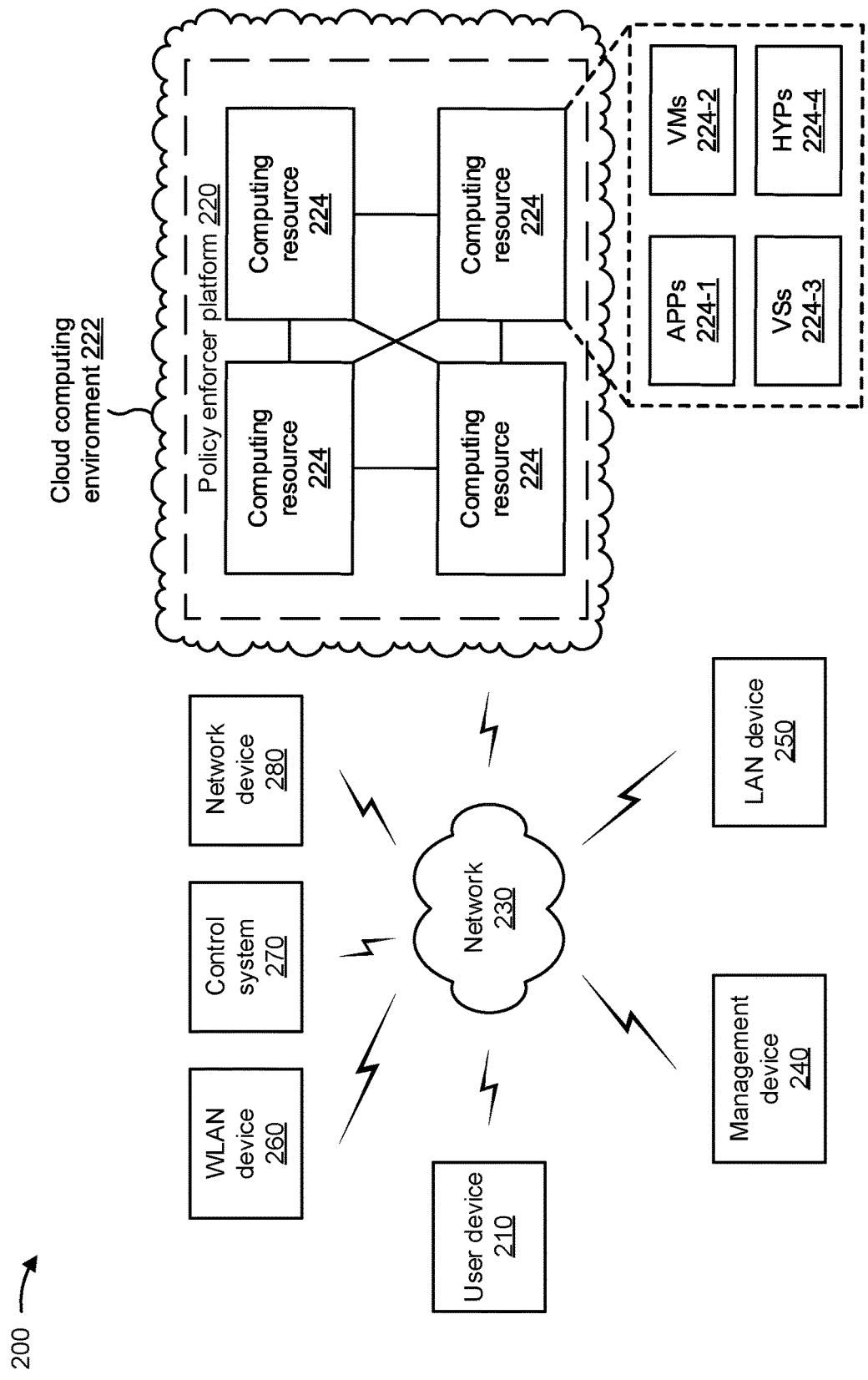
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a policy enforcer platform 220, a network 230, a management device 240, a LAN device 250, a WLAN device 260, a control system 270, and a network device 280. Devices of environment 200 may interconnect via wired connections, wireless connections, or a combination of wired and wireless connections.

User device 210 includes one or more devices capable of receiving, generating, storing, processing, and/or providing information, such as information described herein. For example, user device 210 may include a mobile phone (e.g., a smart phone, a radiotelephone, etc.), a laptop computer, a tablet computer, a desktop computer, a handheld computer, a gaming device, a wearable communication device (e.g., a smart wristwatch, a pair of smart eyeglasses, etc.), or a similar type of device. In some implementations, user device 210 may receive information from and/or transmit information to one or more other devices of environment 200.

Policy enforcer platform 220 includes one or more devices capable of enforcing threat policy actions based on network addresses of host threats. In some implementations, policy enforcer platform 220 may be designed to be modular such that certain software components may be swapped in or out depending on a particular need. As such, policy enforcer platform 220 may be easily and/or quickly reconfigured for different uses. In some implementations, policy enforcer platform 220 may receive information from and/or transmit information to one or more other devices of environment 200.

In some implementations, as shown, policy enforcer platform 220 may be hosted in a cloud computing environment 222. Notably, while implementations described herein describe policy enforcer platform 220 as being hosted in cloud computing environment 222, in some implementations, policy enforcer platform 220 may not be cloud-based (i.e., may be implemented outside of a cloud computing environment, such as within one or more server devices) or may be partially cloud-based.

Cloud computing environment 222 includes an environment that hosts policy enforcer platform 220. Cloud computing environment 222 may provide computation, software, data access, storage, etc. services that do not require end-user knowledge of a physical location and configuration of system(s) and/or device(s) that hosts policy enforcer platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host policy enforcer platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by user device 210. Application 224-1 may eliminate a need to install and execute the software applications on user device 210. For example, application 224-1 may include software associated with policy enforcer platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of user device 210 or an operator of policy enforcer platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Management device 240 includes one or more devices capable of receiving, generating, storing, processing, and/or providing information described herein. For example, management device 240 may include a server (e.g., in a data center or a cloud computing environment), a data center (e.g., a multi-server micro data center), a workstation computer, a VM provided in a cloud computing environment, or a similar type of device. In some implementations, management device 240 may receive information from and/or provide information to one or more other devices of environment 200. In some implementations, management device 240 may be a physical device implemented within a housing, such as a chassis. In some implementations, management device 240 may be a virtual device implemented by one or more computer devices of a cloud computing environment or a data center. In some implementations, management device 240 may identify host threat feeds generated by endpoint hosts (e.g., user devices 210), and may analyze and/or manage the host threat feeds.

LAN device 250 includes one or more devices capable of receiving, generating, storing, processing, and/or providing information described herein. For example, LAN device 250 may include a network device (e.g., as described herein), a user device (e.g., as described herein), a server device, and/or the like. In some implementations, LAN device 250 may receive information from and/or provide information to one or more other devices of environment 200. In some implementations, LAN device 250 may be a physical device implemented within a housing, such as a chassis. In some implementations, LAN device 250 may be a virtual device implemented by one or more computer devices of a cloud computing environment or a data center.

WLAN device 260 includes one or more devices capable of receiving, generating, storing, processing, and/or providing information described herein. For example, WLAN device 260 may include a network device (e.g., as described herein), a user device (e.g., as described herein), a server device, and/or the like. In some implementations, WLAN device 260 may receive information from and/or provide information to one or more other devices of environment 200. In some implementations, WLAN device 260 may be a physical device implemented within a housing, such as a chassis. In some implementations, WLAN device 260 may be a virtual device implemented by one or more computer devices of a cloud computing environment or a data center.

Control system 270 includes one or more devices capable of receiving, generating, storing, processing, and/or providing information described herein. For example, control system 270 may include a server (e.g., in a data center or a cloud computing environment), a data center (e.g., a multi-server micro data center), a workstation computer, a VM provided in a cloud computing environment, or a similar type of device. In some implementations, control system 270 may receive information from and/or provide information to one or more other devices of environment 200. In some implementations, control system 270 may be a physical device implemented within a housing, such as a chassis. In some implementations, control system 270 may be a virtual device implemented by one or more computer devices of a cloud computing environment or a data center. In some implementations, control system 270 may include an element management system (EMS) that manages network elements (e.g., LAN devices 250, WLAN devices 260, network devices 280, and/or the like), and performs fault management, configuration, accounting, performance and security, and/or the like.

Network device 280 includes one or more devices (e.g., one or more traffic transfer devices) capable of receiving, providing, storing, generating, and/or processing information described herein. For example, network device 280 may include a firewall, a router, a policy enforcer, a gateway, a switch, a hub, a bridge, a reverse proxy, a server (e.g., a proxy server), a security device, an intrusion detection device, a load balancer, or a similar device. In some implementations, network device 280 may receive information from and/or provide information to one or more other devices of environment 200. In some implementations, network device 280 may be a physical device implemented within a housing, such as a chassis. In some implementations, network device 280 may be a virtual device implemented by one or more computer devices of a cloud computing environment or a data center.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
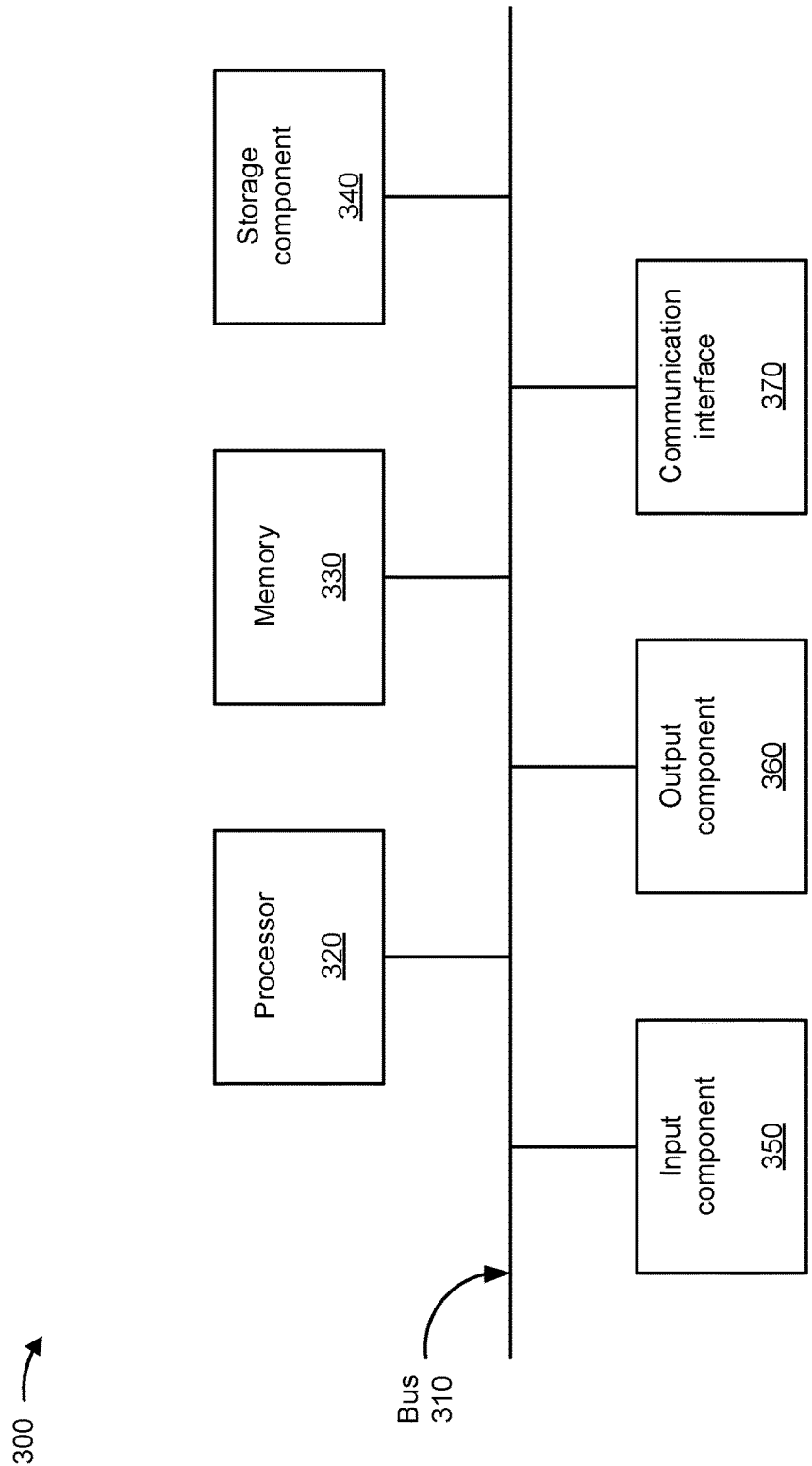
FIG. 3 is a diagram of example components of one or more devices of FIG. 2.

FIG. 3 is a diagram of example components of a device 300. Device 300 may correspond to user device 210, policy enforcer platform 220, computing resource 224, management device 240, LAN device 250, WLAN device 260, control system 270, and/or network device 280. In some implementations, user device 210, policy enforcer platform 220, computing resource 224, management device 240, LAN device 250, WLAN device 260, control system 270, and/or network device 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
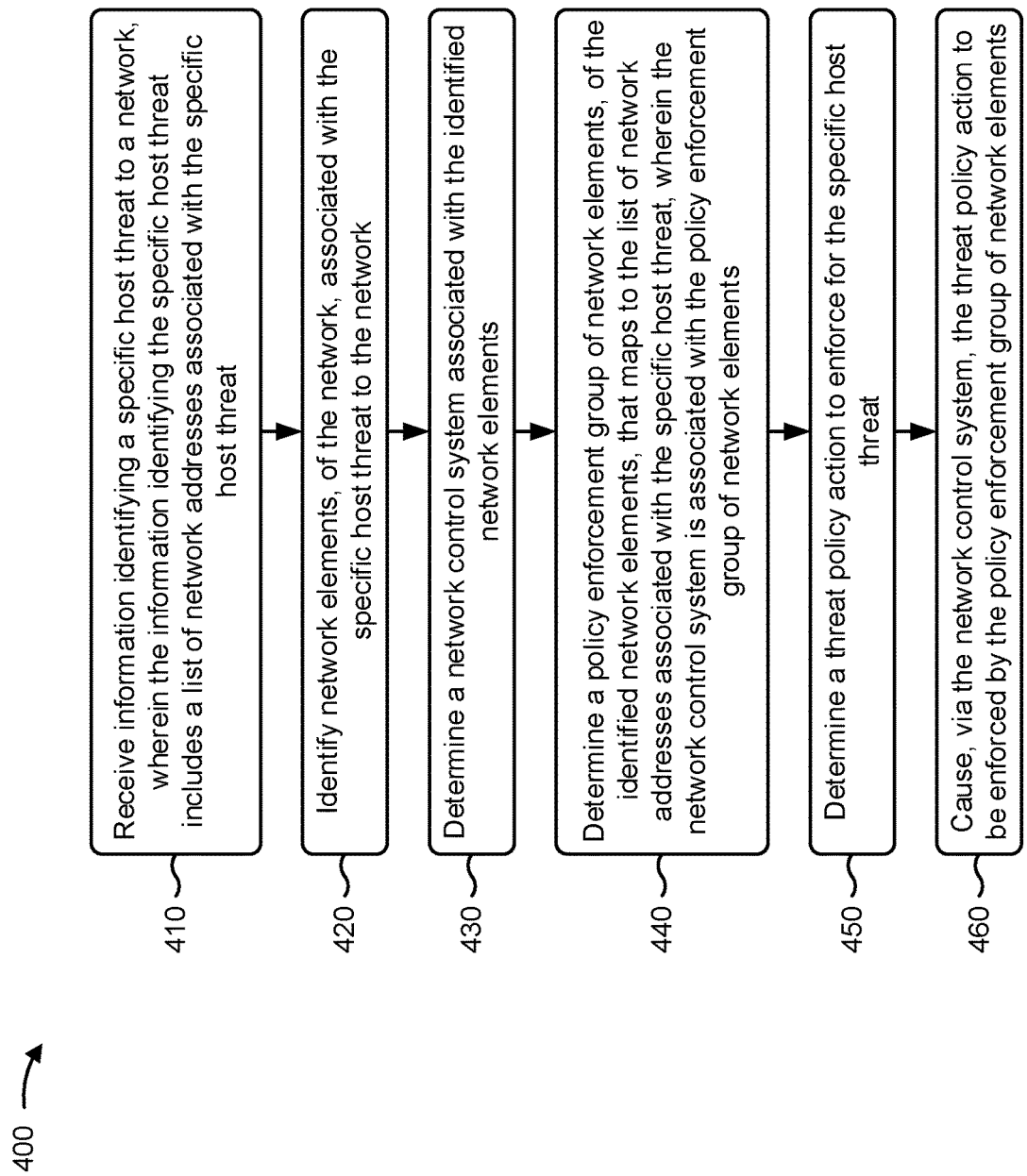
FIG. 4 is a flow chart of an example process for enforcing threat policy actions based on network addresses of host threats.

FIG. 4 is a flow chart of an example process 400 for enforcing threat policy actions based on network addresses of host threats. In some implementations, one or more process blocks of FIG. 4 may be performed by a policy enforcer platform (e.g., policy enforcer platform 220). In some implementations, one or more process blocks of FIG. 4 may be performed by another device or a group of devices separate from or including policy enforcer platform 220, such as management device 240 and/or control system 270.

As shown in FIG. 4, process 400 may include receiving information identifying a specific host threat to a network, wherein the information identifying the specific host threat includes a list of network addresses associated with the specific host threat (block 410). For example, the policy enforcer platform (e.g., using computing resource 224, processor 320, communication interface 370, and/or the like) may receive information identifying a specific host threat to a network, as described above in connection with FIGS. 1A-2. In some implementations, the information identifying the specific host threat may include a list of network addresses associated with the specific host threat.

As further shown in FIG. 4, process 400 may include identifying network elements, of the network, associated with the specific host threat to the network (block 420). For example, the policy enforcer platform (e.g., using computing resource 224, processor 320, memory 330, and/or the like) may identify network elements, of the network, associated with the specific host threat to the network, as described above in connection with FIGS. 1A-2.

As further shown in FIG. 4, process 400 may include determining a network control system associated with the identified network elements (block 430). For example, the policy enforcer platform (e.g., using computing resource 224, processor 320, storage component 340, and/or the like) may determine a network control system associated with the identified network elements, as described above in connection with FIGS. 1A-2.

As further shown in FIG. 4, process 400 may include determining a policy enforcement group of network elements, of the identified network elements, that maps to the list of network addresses associated with the specific host threat, where the network control system is associated with the policy enforcement group of network elements (block 440). For example, the policy enforcer platform (e.g., using computing resource 224, processor 320, memory 330, and/or the like) may determine a policy enforcement group of network elements, of the identified network elements, that maps to the list of network addresses associated with the specific host threat, as described above in connection with FIGS. 1A-2. In some implementations, the network control system may be associated with the policy enforcement group of network elements.

As further shown in FIG. 4, process 400 may include determining a threat policy action to enforce for the specific host threat (block 450). For example, the policy enforcer platform (e.g., using computing resource 224, processor 320, storage component 340, and/or the like) may determine a threat policy action to enforce for the specific host threat, as described above in connection with FIGS. 1A-2.

As further shown in FIG. 4, process 400 may include causing, via the network control system, the threat policy action to be enforced by the policy enforcement group of network elements (block 460). For example, the policy enforcer platform (e.g., using computing resource 224, processor 320, communication interface 370, and/or the like) may cause, via the network control system, the threat policy action to be enforced by the policy enforcement group of network elements, as described above in connection with FIGS. 1A-2.

Process 400 may include additional implementations, such as any single implementation or any combination of implementations described below and/or in connection with one or more other processes described elsewhere herein.

In some implementations, the policy enforcer platform may receive network topology information associated with the network, and may generate, based on the network topology information, a data structure that includes information identifying capabilities of each network element of the network. In some implementations, when identifying the network elements, the policy enforcer platform may identify, based on the data structure, the network elements associated with the specific host threat to the network.

In some implementations, the policy enforcer platform may receive host threat feed information associated with endpoint hosts communicating with the network, and may generate, based on the host threat feed information, a data structure that includes information identifying sessions associated with the endpoint hosts, wherein the specific host threat may be caused by one of the endpoint hosts. In some implementations, when identifying the network elements, the policy enforcer platform may identify, based on the data structure, the network elements associated with the specific host threat to the network. In some implementations, the policy enforcer platform may identify network control systems associated with the endpoint hosts, and may add, to the data structure, information identifying the network control systems associated with the endpoint hosts.

In some implementations, the policy enforcer platform may receive host threat feed information associated with endpoint hosts communicating with the network, wherein the specific host threat may be caused by one of the endpoint hosts. The policy enforcer platform may cause, based on the host threat feed information, host threat traffic external to the network to be blocked at a perimeter network element of the network, and/or may cause, based on the host threat feed information, host threat traffic internal to the network to be blocked at a switching layer of the network.

In some implementations, the policy enforcer platform may receive host threat feed information associated with endpoint hosts communicating with the network, and may tag host threats, identified by the host threat feed information, with particular identifications. In some implementations, the information identifying the specific host threat may identify the specific host threat based on a particular identification, of the particular identifications, associated with the specific host threat. In some implementations, the policy enforcer platform may monitor host threat traffic across the network based on the particular identifications.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for enforcing threat policy actions based on network addresses of host threats. In some implementations, one or more process blocks of FIG. 5 may be performed by a policy enforcer platform (e.g., policy enforcer platform 220). In some implementations, one or more process blocks of FIG. 5 may be performed by another device or a group of devices separate from or including policy enforcer platform 220, such as management device 240 and/or control system 270.

As shown in FIG. 5, process 500 may include receiving host threat feed information associated with endpoint hosts communicating with a network (block 510). For example, the policy enforcer platform (e.g., using computing resource 224, processor 320, communication interface 370, and/or the like) may receive host threat feed information associated with endpoint hosts communicating with a network, as described above in connection with FIGS. 1A-2.

As further shown in FIG. 5, process 500 may include identifying, from the host threat feed information, a specific host threat to the network, wherein the specific host threat may be caused by one of the endpoint hosts, and the specific host threat may be associated with a list of network addresses of the network (block 520). For example, the policy enforcer platform (e.g., using computing resource 224, processor 320, memory 330, and/or the like) may identify, from the host threat feed information, a specific host threat to the network, as described above in connection with FIGS. 1A-2. In some implementations, the specific host threat may be caused by one of the endpoint hosts, and the specific host threat may be associated with a list of network addresses of the network.

As further shown in FIG. 5, process 500 may include identifying network elements, of the network, associated with the specific host threat to the network (block 530). For example, the policy enforcer platform (e.g., using computing resource 224, processor 320, storage component 340, and/or the like) may identify network elements, of the network, associated with the specific host threat to the network, as described above in connection with FIGS. 1A-2.

As further shown in FIG. 5, process 500 may include determining a network control system associated with the identified network elements (block 540). For example, the policy enforcer platform (e.g., using computing resource 224, processor 320, memory 330, and/or the like) may determine a network control system associated with the identified network elements, as described above in connection with FIGS. 1A-2.

As further shown in FIG. 5, process 500 may include determining a policy enforcement group of network elements, of the identified network elements, that maps to the list of network addresses associated with the specific host threat, wherein the network control system may be associated with the policy enforcement group of network elements (block 550). For example, the policy enforcer platform (e.g., using computing resource 224, processor 320, storage component 340, and/or the like) may determine a policy enforcement group of network elements, of the identified network elements, that maps to the list of network addresses associated with the specific host threat, as described above in connection with FIGS. 1A-2. In some implementations, the network control system may be associated with the policy enforcement group of network elements.

As further shown in FIG. 5, process 500 may include determining a threat policy action to enforce for the specific host threat (block 560). For example, the policy enforcer platform (e.g., using computing resource 224, processor 320, memory 330, and/or the like) may determine a threat policy action to enforce for the specific host threat, as described above in connection with FIGS. 1A-2.

As further shown in FIG. 5, process 500 may include causing, via the network control system, the threat policy action to be enforced by the policy enforcement group of network elements (block 570). For example, the policy enforcer platform (e.g., using computing resource 224, processor 320, communication interface 370, and/or the like) may cause, via the network control system, the threat policy action to be enforced by the policy enforcement group of network elements, as described above in connection with FIGS. 1A-2.

Process 500 may include additional implementations, such as any single implementation or any combination of implementations described below and/or in connection with one or more other processes described elsewhere herein.

In some implementations, the policy enforcer platform may generate, based on the host threat feed information, a data structure that includes information identifying sessions associated with the endpoint hosts. In some implementations, when identifying the network elements, the policy enforcer platform may identify, based on the data structure, the network elements associated with the specific host threat to the network.

In some implementations, the policy enforcer platform may receive network topology information associated with the network, and may generate, based on the network topology information, a data structure that includes information identifying capabilities of each network element of the network. In some implementations, when identifying the network elements, the policy enforcer platform may identify, based on the data structure, the network elements associated with the specific host threat to the network.

In some implementations, the policy enforcer platform may identify network control systems associated with the endpoint hosts, and may generate, based on identifying the network control systems, a data structure that includes information identifying the network control systems associated with the endpoint hosts. In some implementations, the policy enforcer platform may cause, based on the host threat feed information, host threat traffic external to the network to be blocked at a perimeter network element of the network, and/or may cause, based on the host threat feed information, host threat traffic internal to the network to be blocked at a switching layer of the network.

In some implementations, the policy enforcer platform may tag host threats, identified by the host threat feed information, with particular identifications. In some implementations, each of the particular identifications may be based on a media access control (MAC) address, session information, and/or a hardware identifier associated with one of the endpoint hosts. In some implementations, when identifying the specific host threat, the policy enforcer platform may identify the specific host threat based on a particular identification, of the particular identifications, associated with the specific host threat.

In some implementations, the policy enforcer platform may monitor host threat traffic across the network based on the particular identifications, and may provide information associated with the host threat traffic to a management device to permit the management device to analyze the host threat traffic.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for enforcing threat policy actions based on network addresses of host threats. In some implementations, one or more process blocks of FIG. 6 may be performed by a policy enforcer platform (e.g., policy enforcer platform 220). In some implementations, one or more process blocks of FIG. 6 may be performed by another device or a group of devices separate from or including policy enforcer platform 220, such as management device 240 and/or control system 270.

As shown in FIG. 6, process 600 may include receiving network topology information associated with a network (block 610). For example, the policy enforcer platform (e.g., using computing resource 224, processor 320, communication interface 370, and/or the like) may receive network topology information associated with a network, as described above in connection with FIGS. 1A-2.

As further shown in FIG. 6, process 600 may include generating, based on the network topology information, a data structure that includes information identifying capabilities of each network element of the network (block 620). For example, the policy enforcer platform (e.g., using computing resource 224, processor 320, memory 330, and/or the like) may generate, based on the network topology information, a data structure that includes information identifying capabilities of each network element of the network, as described above in connection with FIGS. 1A-2.

As further shown in FIG. 6, process 600 may include receiving information identifying a specific host threat to the network, wherein the information identifying the specific host threat may include a list of network addresses associated with the specific host threat (block 630). For example, the policy enforcer platform (e.g., using computing resource 224, processor 320, communication interface 370, and/or the like) may receive information identifying a specific host threat to the network, as described above in connection with FIGS. 1A-2. In some implementations, the information may identify the specific host threat may include a list of network addresses associated with the specific host threat.

As further shown in FIG. 6, process 600 may include identifying, based on the data structure, network elements associated with the specific host threat to the network (block 640). For example, the policy enforcer platform (e.g., using computing resource 224, processor 320, memory 330, and/or the like) may identify, based on the data structure, network elements associated with the specific host threat to the network, as described above in connection with FIGS. 1A-2.

As further shown in FIG. 6, process 600 may include determining a network control system associated with the identified network elements (block 650). For example, the policy enforcer platform (e.g., using computing resource 224, processor 320, storage component 340, and/or the like) may determine a network control system associated with the identified network elements, as described above in connection with FIGS. 1A-2.

As further shown in FIG. 6, process 600 may include determining a policy enforcement group of network elements, of the identified network elements, that maps to the list of network addresses associated with the specific host threat, wherein the network control system may be associated with the policy enforcement group of network elements (block 660). For example, the policy enforcer platform (e.g., using computing resource 224, processor 320, memory 330, and/or the like) may determine a policy enforcement group of network elements, of the identified network elements, that maps to the list of network addresses associated with the specific host threat, as described above in connection with FIGS. 1A-2. In some implementations, the network control system may be associated with the policy enforcement group of network elements.

As further shown in FIG. 6, process 600 may include determining a threat policy action to enforce for the specific host threat (block 670). For example, the policy enforcer platform (e.g., using computing resource 224, processor 320, storage component 340, and/or the like) may determine a threat policy action to enforce for the specific host threat, as described above in connection with FIGS. 1A-2.

As further shown in FIG. 6, process 600 may include causing, via the network control system, the threat policy action to be enforced by the policy enforcement group of network elements (block 680). For example, the policy enforcer platform (e.g., using computing resource 224, processor 320, communication interface 370, and/or the like) may cause, via the network control system, the threat policy action to be enforced by the policy enforcement group of network elements, as described above in connection with FIGS. 1A-2.

Process 600 may include additional implementations, such as any single implementation or any combination of implementations described below and/or in connection with one or more other processes described elsewhere herein.

In some implementations, the policy enforcer platform may receive host threat feed information associated with endpoint hosts communicating with the network, and may generate, based on the host threat feed information, another data structure that includes information identifying sessions associated with the endpoint hosts, where the specific host threat may be caused by one of the endpoint hosts. In some implementations, when identifying the network elements, the policy enforcer platform may identify the network elements associated with the specific host threat to the network based on the data structure and the other data structure.

In some implementations, the policy enforcer platform may receive host threat feed information associated with endpoint hosts communicating with the network, where the specific host threat may be caused by one of the endpoint hosts. In some implementations, the policy enforcer platform may cause, based on the host threat feed information, host threat traffic external to the network to be blocked at a perimeter network element of the network, and/or may cause, based on the host threat feed information, host threat traffic internal to the network to be blocked at a switching layer of the network.

In some implementations, the policy enforcer platform may receive host threat feed information associated with endpoint hosts communicating with the network, and may tag host threats, identified by the host threat feed information, with particular identifications. In some implementations, the information identifying the specific host threat may identify the specific host threat based on a particular identification, of the particular identifications, associated with the specific host threat.

In some implementations, the policy enforcer platform may monitor host threat traffic across the network based on the particular identifications. In some implementations, the policy enforcer platform may provide information associated with the host threat traffic to a management device to prevent duplicate analysis of the host threat traffic by the management device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Some implementations described herein provide a policy enforcer platform that enforces threat policy actions based on network addresses of host threats. For example, the policy enforcer platform may receive information identifying a specific host threat to a network and including a list of network addresses associated with the specific host threat. The policy enforcer platform may identify network elements, of the network, associated with the specific host threat to the network, and may determine a network control system associated with the identified network elements. The policy enforcer platform may determine a policy enforcement group of network elements, of the identified network elements, that maps to the list of network addresses associated with the specific host threat, and the network control system may be associated with the policy enforcement group of network elements. The policy enforcer platform may determine a threat policy action to enforce for the specific host threat, and may cause, via the network control system, the threat policy action to be enforced by the policy enforcement group of network elements.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device and from a management device, host threat feed information associated with endpoint hosts communicating with a network,
      wherein the host threat feed information includes threat scores associated with sessions of the endpoint hosts;
   tagging, by the device and based on the threat scores indicating that the endpoint hosts represent threats, the endpoint hosts with unique identifications,
      wherein a unique identification, of the unique identifications, is based on one or more of:
         a media access control (MAC) address associated with a particular endpoint host, of the endpoint hosts,
         session information associated with the particular endpoint host, or
         a hardware identifier associated with the particular endpoint host;
   monitoring, by the device, based on the unique identifications, and as the endpoint hosts migrate through the network, host threat traffic across the network;
   identifying, by the device and based on the unique identification, a specific threat, of the threats, that is associated with the particular endpoint host;
   providing, by the device, information associated with the host threat traffic to the management device;
   determining, by the device, a threat policy action to enforce for the specific threat;
   causing, by the device, the threat policy action to be enforced;
   generating, by the device, a data structure that includes information identifying the sessions;

identifying, by the device and based on the data structure and the unique identification, at least one network element associated with the specific threat;
identifying, by the device, a network control system associated with the at least one network element; and
causing, by the device and via the network control system, the threat policy action to be enforced by a policy enforcement group associated with the at least one network element.

2. The method of claim 1, wherein
providing the information associated with the host threat traffic to the management device is to prevent duplicate analysis of the host threat traffic by the management device.

3. The method of claim 1, wherein information identifying the specific threat includes a list of network addresses associated with the specific threat.

4. The method of claim 3, further comprising:
causing, based on the host threat feed information, host threat traffic external to the network to be blocked at a perimeter network element of the network; and
causing, based on the host threat feed information, host threat traffic internal to the network to be blocked at a switching layer of the network.

5. The method of claim 3, further comprising:
determining a policy enforcement group of at least one network element that maps to the list of network addresses associated with the specific threat.

6. The method of claim 1, further comprising:
identifying network control systems associated with the endpoint hosts; and
adding, to the data structure, information identifying the network control systems associated with the endpoint hosts.

7. A device, comprising:
one or more memories; and
one or more processors to:
  receive, from a management device, host threat feed information associated with endpoint hosts communicating with a network,
    wherein the host threat feed information includes:
      information identifying network addresses associated with threat feeds, and
      threat scores associated with sessions of the endpoint hosts;
  tag, based on the threat scores indicating that the endpoint hosts represent threats, the endpoint hosts with unique identifications,
    wherein a unique identification, of the unique identifications, is based on one of:
      a media access control (MAC) address associated with a particular endpoint host, of the endpoint hosts,
      session information associated with the particular endpoint host, or
      a hardware identifier associated with the particular endpoint host;
  monitor, based on the unique identifications and as the endpoint hosts migrate through the network, host threat traffic across the network;
  identify, based on the unique identification, a specific threat, of the threats,
    that is associated with the particular endpoint host;
  provide information associated with the host threat traffic to the management device to permit the management device to analyze the host threat traffic;
  determine a threat policy action to enforce for the specific threat;
  cause the threat policy action to be enforced;
  generate a data structure that includes information identifying the sessions;
  identify, based on the data structure and the unique identification, at least one network element associated with the specific threat;
  identify a network control system associated with the at least one network element; and
  cause, via the network control system, the threat policy action to be enforced by a policy enforcement group associated with the at least one network element.

8. The device of claim 7, wherein
providing the information associated with the host threat traffic to the management device is to permit the management device to analyze the host threat traffic.

9. The device of claim 7, wherein
providing the information associated with the host threat traffic to the management device is to prevent duplicate analysis of the host threat traffic by the management device.

10. The device of claim 7, wherein the one or more processors are further to:
add information identifying the unique identifications to the data structure,
  wherein the data structure includes information identifying the endpoint hosts.

11. The device of claim 7, wherein information identifying the specific threat includes a list of network addresses associated with the specific threat.

12. The device of claim 11, wherein the one or more processors are further to:
cause, based on the host threat feed information, host threat traffic external to the network to be blocked at a perimeter network element of the network; and
cause, based on the host threat feed information, host threat traffic internal to the network to be blocked at a switching layer of the network.

13. A non-transitory computer-readable medium storing instructions, the instructions comprising:
one or more instructions that, when executed by one or more processors, cause the one or more processors to:
  receive, from a management device, host threat feed information associated with endpoint hosts communicating with a network,
    wherein the host threat feed information includes:
    information identifying network addresses associated with threat feeds, and
    threat scores associated with sessions of the endpoint hosts;
  tag, based on the threat scores indicating that the endpoint hosts represent threats, the endpoint hosts with unique identifications,
    wherein a unique identification, of the unique identifications, is based on one of:
      a media access control (MAC) address associated with a particular endpoint host, of the endpoint hosts,
      session information associated with the particular endpoint host, or
      a hardware identifier associated with the particular endpoint host;
  monitor host threat traffic across the network based on the unique identifications;
  identify, based on the unique identification, a specific threat, of the threats;

provide information associated with the host threat traffic to the management device;

determine a threat policy action to enforce for the specific threat;

cause the threat policy action to be enforced;

generate a data structure that includes information identifying the sessions;

identify, based on the data structure and the unique identification, at least one network element associated with the specific threat;

identify a network control system associated with the at least one network element; and cause, via the network control system, the threat policy action to be enforced by a policy enforcement group associated with the at least one network element.

14. The non-transitory computer-readable medium of claim 13, wherein the instructions further comprise:
one or more instructions that, when executed by the one or more processors, cause the one or more processors to:
identify network control systems associated with the endpoint hosts,
wherein the data structure includes information identifying the network control systems associated with the endpoint hosts.

15. The non-transitory computer-readable medium of claim 13, wherein
providing the information associated with the host threat traffic to the management device is to prevent duplicate analysis of the host threat traffic by the management device.

16. The non-transitory computer-readable medium of claim 13, wherein the specific threat is associated with the particular endpoint host.

\* \* \* \* \*